United States Patent
Cohen et al.

(10) Patent No.: US 11,149,154 B2
(45) Date of Patent: Oct. 19, 2021

(54) SPRAY-COATING METHOD WITH PARTICLE ALIGNMENT CONTROL

(71) Applicants: Massachusetts Institute of Technology, Cambridge, MA (US); Khalifa University of Science and Technology, Abu Dhabi (AE)

(72) Inventors: Robert E. Cohen, Jamaica Plain, MA (US); Michael F. Rubner, Westford, MA (US); Dayong Chen, Dorchester, MA (US); Roberta Polak, Boston, MA (US); Kenan Song, Quincy, MA (US); Khalid Askar, Abu Dhabi (AE)

(73) Assignees: MASSACHUSETTS INSTITUTE OF TECHNOLOGY, Cambridge, MA (US); KHALIFA UNIVERSITY OF SCIENCE AND TECHNOLOGY, Abu Dhabi (AE)

( * ) Notice: Subject to any disclaimer, the term of this patent is extended or adjusted under 35 U.S.C. 154(b) by 203 days.

(21) Appl. No.: 15/635,159

(22) Filed: Jun. 27, 2017

(65) Prior Publication Data
US 2018/0002550 A1    Jan. 4, 2018

Related U.S. Application Data

(60) Provisional application No. 62/356,512, filed on Jun. 29, 2016.

(51) Int. Cl.
*C09D 7/00*    (2018.01)
*C09D 7/40*    (2018.01)
(Continued)

(52) U.S. Cl.
CPC .............. *C09D 7/70* (2018.01); *B05D 1/02* (2013.01); *B29C 70/00* (2013.01); *C09D 7/20* (2018.01); *C09D 7/61* (2018.01); *C09D 163/00* (2013.01); *B05D 3/067* (2013.01); *B05D 2203/35* (2013.01); *B05D 2401/10* (2013.01);
(Continued)

(58) Field of Classification Search
CPC .................................. B05D 1/02; C09D 7/70
See application file for complete search history.

(56) References Cited

U.S. PATENT DOCUMENTS

| | | | |
|---|---|---|---|
| 2008/0248201 A1* | 10/2008 | Corkery | C09D 7/70 427/256 |
| 2008/0290020 A1* | 11/2008 | Maran | B01D 53/228 210/500.27 |

(Continued)

OTHER PUBLICATIONS

Majumder et al., "Enhanced Flow in Carbon Nanotubes" (2005), Nature.*

*Primary Examiner* — Nathan T Leong
(74) *Attorney, Agent, or Firm* — Honigman LLP

(57) ABSTRACT

A simple spray coating process can be utilized to create epoxy/HNT nanocomposites with vertically aligned nanotubes. Important mechanical properties such as modulus and hardness values can be optimized and enhanced by controlling the level of nanotube dispersion during processing and the final orientation of the nanotubes. Thus, a technologically relevant processing scheme can be used to fabricate HNT nanocomposites with a high level of control over nanotube alignment and the resulting mechanical properties.

13 Claims, 25 Drawing Sheets

(51) Int. Cl.
*B05D 1/02* (2006.01)
*C09D 163/00* (2006.01)
*C09D 7/20* (2018.01)
*C09D 7/61* (2018.01)
*B29C 70/00* (2006.01)
B05D 3/06 (2006.01)
C08K 7/26 (2006.01)
C08K 3/34 (2006.01)
C08K 3/36 (2006.01)
C08K 3/04 (2006.01)
B82Y 30/00 (2011.01)
B82Y 40/00 (2011.01)

(52) U.S. Cl.
CPC ......... *B05D 2504/00* (2013.01); *B82Y 30/00* (2013.01); *B82Y 40/00* (2013.01); *C08K 3/041* (2017.05); *C08K 3/042* (2017.05); *C08K 3/044* (2017.05); *C08K 3/34* (2013.01); *C08K 3/346* (2013.01); *C08K 3/36* (2013.01); *C08K 7/26* (2013.01); *C08K 2201/011* (2013.01)

(56) References Cited

U.S. PATENT DOCUMENTS

2011/0027567 A1* 2/2011 Kekicheff ............... B05D 3/00
428/220
2013/0108826 A1* 5/2013 Chakravarthi ..... H01B 13/0036
428/114

* cited by examiner

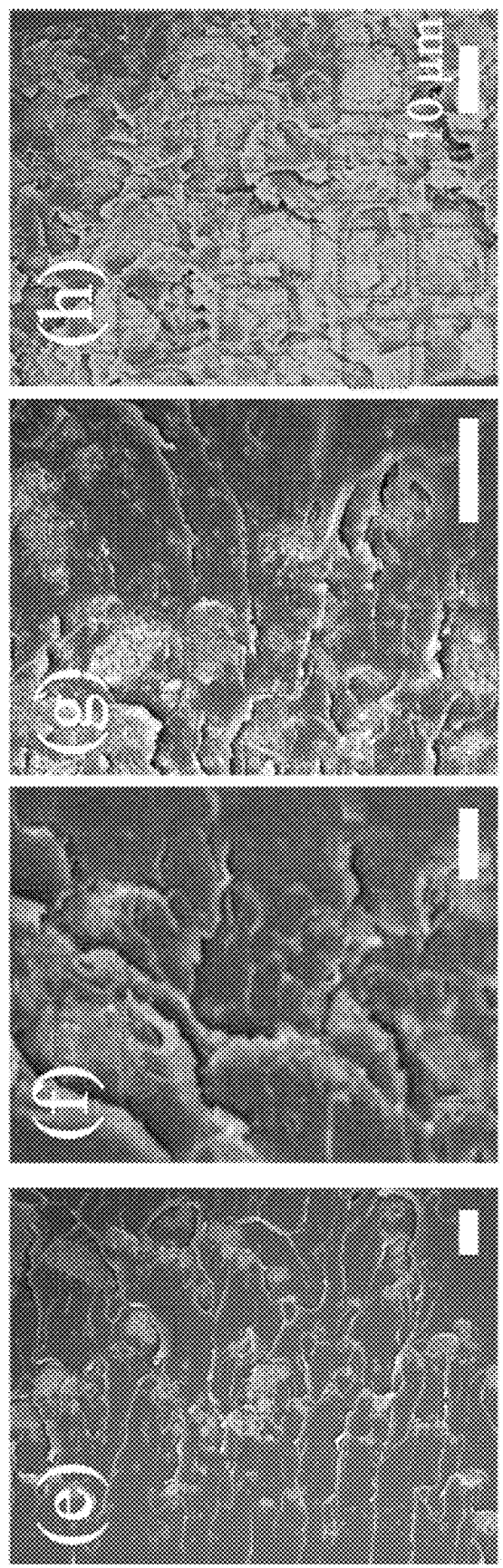

SPRAY-COATING METHOD WITH PARTICLE ALIGNMENT CONTROL

CLAIM OF PRIORITY

This application claims the benefit of U.S. Provisional Application No. 62/356,512, filed Jun. 29, 2016, which is incorporated by reference in its entirety.

TECHNICAL FIELD

This invention relates to coatings including polymer composites.

BACKGROUND

Advanced polymer coatings have applications in almost every engineering sector including the automotive, energy and aerospace sectors to name just a few. See, Mathiazhagan, A.; Joseph, R., Nanotechnology-a New prospective in organic coating-review. *International Journal of Chemical Engineering and Applications* 2011, 2, 225, which is incorporated by reference in its entirety. For the majority of these coatings, mechanical durability is critical and depends on factors such as stiffness, hardness, and toughness as well as abrasion or corrosion resistance. See, Wu, L.; Guo, X.; Zhang, J., Abrasive resistant coatings—a review. *Lubricants* 2014, 2, 66-89, and Montemor, M., Functional and smart coatings for corrosion protection: a review of recent advances. *Surface and Coatings Technology* 2014, 258, 17-37, each of which is incorporated by reference in its entirety.

SUMMARY

A method of making a coating can include preparing a surface and spraying a mixture of a polymer with a plurality of nanotubes through a nozzle onto the surface.

In certain embodiments, the nanotubes can include halloysite nanotubes.

In certain embodiments, the nanotubes can include carbon nanotubes, graphene, nanoclay, or silica.

In certain embodiments, the polymer can include epoxy.

In certain embodiments, the polymer can include starch, chitosan, gelatin, cellulose, pectin, or polyvinyl alcohol.

In certain embodiments, the plurality of nanotubes can be aligned unidirectionally.

In certain embodiments, the plurality of nanotubes can be aligned vertically to the surface.

In certain embodiments, the method can further include flowing a compressed air to facilitate spraying the mixture.

In certain embodiments, the mixture can further include a solvent.

In certain embodiments, the solvent can be acetone.

In certain embodiments, the method can further include curing the coating with UV.

A coating can include a polymer composite including a polymer and a plurality of nanotubes, where the nanotubes are aligned vertically to a surface.

In certain embodiments, the nanotubes can include halloysite nanotubes.

In certain embodiments, the nanotubes can include carbon nanotubes, graphene, nanoclay, or silica.

In certain embodiments, the polymer can include epoxy.

In certain embodiments, the polymer can be starch, chitosan, gelatin, cellulose, pectin, or polyvinyl alcohol.

In certain embodiments, the polymer composite can further include a solvent.

In certain embodiments, the solvent can be acetone.

Other aspects, embodiments, and features will be apparent from the following description, the drawings, and the claims.

BRIEF DESCRIPTION OF THE DRAWINGS

FIG. 1C1 shows TEM image of longitudinal view. FIG. 1C2 shows TEM image of cross-section view of a fractured halloysite nanotube.

FIG. 2 shows HNT alignment design in spray coating.

FIG. 3, section (b) shows schematics of HNT orientations in different viscous solutions. FIG. 3, section (c) shows a coating film with labels of the in-plane x/y axes and plane-normal z-axis directions.

FIGS. 10E-10H show dispersion quality of $E_{77}A_{23}H_{20}$ (FIG. 10E), $E_{87}A_{13}H_{20}$ (FIG. 10F), $E_{93}A_7H_{20}$ (FIG. 10G) and $E_{100}A_0H_{20}$ (FIG. 10H).

DETAILED DESCRIPTION

Figure 1A:
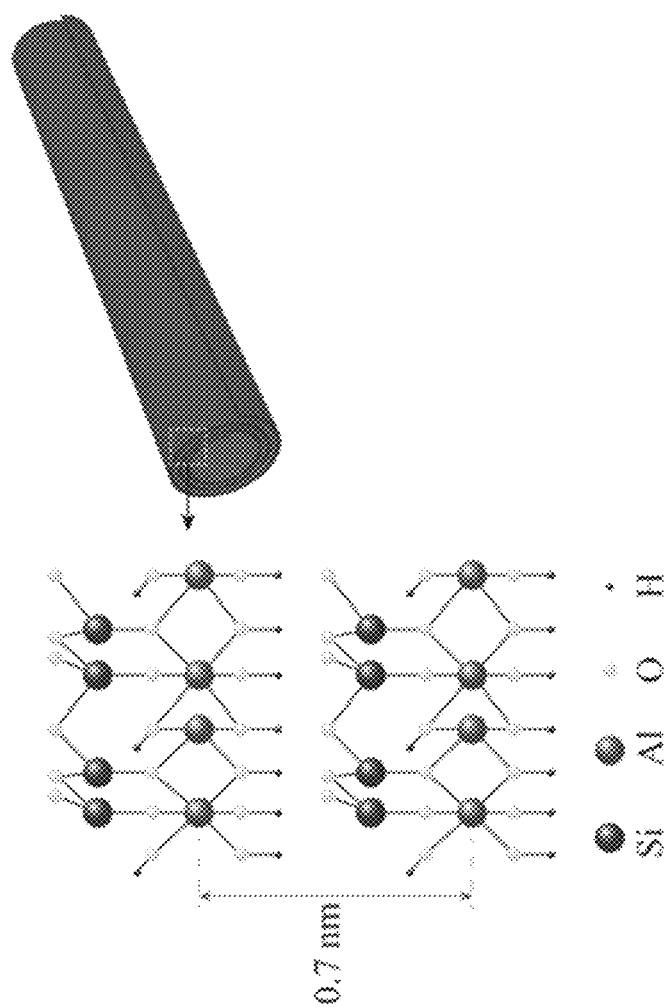
FIG. 1A shows schematic HNT structure.

One method to reinforce a polymer matrix is to include stiff and strong nanosized elements, such as carbon black particles, carbon nanotubes and graphene, inorganic particles of clay and metal oxides and bio-fillers of cellulose and wood. See, Qian, H.; Greenhalgh, E. S.; Shaffer, M. S. P.; Bismarck, A., Carbon nanotube-based hierarchical composites: a review. Journal of Material Chemistry 2010, 20, 4751-4762, Cai, D. Y.; Song, M., Recent advance in functionalized graphene/polymer nanocomposites. Journal of Materials Chemistry 2010, 20, 7906-7915, Azeez, A. A.; Rhee, K. Y.; Park, S. J.; Hui, D., Epoxy clay nanocomposites' processing, properties and applications: A review. Composites Part B: Engineering 2012, and Khalil, H. A.; Bhat, A.; Yusra, A. I., Green composites from sustainable cellulose nanofibrils: a review. Carbohydr. Polym. 2012, 87, 963-979, each of which is incorporated by reference in its entirety. These fillers can be categorized as one-dimensional (1D tubes), two-dimensional (2D sheets) and three-dimensional (3D particles) materials based on their geometric features. See, Dresselhaus, M. S., Fifty years in studying carbon-based materials. Physica Scripta 2012, 2012, 014002, which is incorporated by reference in its entirety. Among them, 1D tubular nanoparticles have been attractive, in part owing to their anisotropic properties. See, Sajanlal, P. R.; Sreeprasad, T. S.; Samal, A. K.; Pradeep, T., Anisotropic nanomaterials: structure, growth, assembly, and functions. Nano Reviews 2011, 2, 4, which is incorporated by reference in its entirety. An example would be the dependence of Young's modulus and tension/compression strength on the direction of mechanical load in 1D nanoparticle filled composites. To fully exploit useful anisotropic properties, control of preferential particle alignment is essential and a widely-studied issue in composite reinforcement, with focus on fabricating both in-plane and out-of-plane oriented assemblies. Dispersions of nanotubes in appropriate fluid media and use of either (i) exterior field forces (electric field or magnetic field), or (ii) shear forces induced by extrusion/injection flow have been explored with a variety of systems. See, Lan, Y.; Wang, Y.; Ren, Z. F., Physics and applications of aligned carbon nanotubes. Advances in Physics 2011, 60, 553-678, Martin, C.; Sandler, J.; Windle, A.; Schwarz, M.-K.; Bauhofer, W.; Schulte, K.; Shaffer, M., Electric field-induced aligned multi-wall carbon nanotube networks in epoxy composites. Polymer 2005, 46, 877-886, Kaida, S.; Matsui, J.; Sagae, T.; Hoshikawa, Y.; Kyotani, T.; Miyashita, T., The production of large scale ultrathin aligned CNT films by combining AC electric field with liquid flow. Carbon 2013, 59, 503-511, Camponeschi, E.; Vance, R.; Al-Haik, M.; Garmestani, H.; Tannenbaum, R., Properties of carbon nanotube-polymer composites aligned in a magnetic field. Carbon 2007, 45, 2037-2046, Kimura, T.; Ago, H.; Tobita, M.; Ohshima, S.; Kyotani, M.; Yumura, M., Polymer Composites of Carbon Nanotubes Aligned by a Magnetic Field. Advanced Materials 2002, 14, 1380-1383, Sulong, A. B.; Park, J., Alignment of multi-walled carbon nanotubes in a polyethylene matrix by extrusion shear flow: mechanical properties enhancement. J. Compos Mater. 2011, 45, 931-941, Ahadian, S.; Ramón-Azcón, J.; Estili, M.; Liang, X.; Ostrovidov, S.; Shiku, H.; Ramalingam, M.; Nakajima, K.; Sakka, Y.; Bae, H.; Matsue, T.; Khademhosseini, A., Hybrid hydrogels containing vertically aligned carbon nanotubes with anisotropic electrical conductivity for muscle myofiber fabrication. Scientific Reports 2014, 4, 4271, Ramon-Azcon, J.; Ahadian, S.; Estili, M.; Liang, X.; Ostrovidov, S.; Kaji, H.; Shiku, H.; Ramalingam, M.; Nakajima, K.; Sakka, Y., Dielectrophoretically aligned carbon nanotubes to control electrical and mechanical properties of hydrogels to fabricate contractile muscle myofibers. Advanced Materials 2013, 25, 4028-4034, Erb, R. M.; Libanori, R.; Rothfuchs, N.; Studart, A. R., Composites reinforced in three dimensions by using low magnetic fields. Science 2012, 335, 199-204, Martin, J. J.; Fiore, B. E.; Erb, R. M., Designing bioinspired composite reinforcement architectures via 3D magnetic printing. Nature communications 2015, 6, Jalili, R.; Razal, J. M.; Wallace, G. G., Wet-spinning of PEDOT: PSS/Functionalized-SWNTs Composite: a Facile Route Toward Production of Strong and Highly Conducting Multifunctional Fibers. Scientific Reports 2013, 3, 3438, and Veedu, V. P.; Cao, A.; Li, X.; Ma, K.; Soldano, C.; Kar, S.; Ajayan, P. M.; Ghasemi-Nejhad, M. N., Multifunctional composites using reinforced laminae with carbon-nanotube forests. Nat Mater 2006, 5, 457-462, each of which is incorporated by reference in its entirety. Other research has focused on composite fabrication directly from an aligned nanotube forest or an array synthesized by the chemical vapor deposition method (CVD) or electrochemical deposition. See, Zhang, M.; Fang, S.; Zakhidov, A. A.; Lee, S. B.; Aliev, A. E.; Williams, C. D.; Atkinson, K. R.; Baughman, R. H., Strong, transparent, multifunctional, carbon nanotube sheets. Science 2005, 309, 1215-1219, and Chen, T.; Cai, Z.; Qiu, L.; Li, H.; Ren, J.; Lin, H.; Yang, Z.; Sun, X.; Peng, H., Synthesis of aligned carbon nanotube composite fibers with high performances by electrochemical deposition. Journal of Materials Chemistry A 2013, 1, 2211-2216, each of which is incorporated by reference in its entirety. Carbon nanotubes are popular in these methods due to their flexibility, and drawability from a growth substrate. See, Jiang, K.; Li, Q.; Fan, S., Nanotechnology: spinning continuous carbon nanotube yarns. Nature 2002, 419, 801-801, which is incorporated by reference in its entirety. Naturally generated mineral clays such as montmorillonite, mica, talc, kaolinite and halloysite, however, are mechanically brittle and hard to synthesize using CVD. In addition, most of these mineral particles are much cheaper as compared to syntheses of carbon-based analogs. See, Sivamohan, R., The problem of recovering very fine particles in mineral processing—a review. International Journal of Mineral Processing 1990, 28, 247-288, which is incorporated by reference in its entirety.

Halloysite nanotubes (HNTs), a naturally occurring clay mineral with a one-dimensional hollow cylindrical structure, are exceptionally stiff and hard for their ceramic chemical composition. See, Guimaraes, L.; Enyashin, A. N.; Seifert, G.; Duarte, H. A., Structural, electronic, and mechanical properties of single-walled halloysite nanotube models. The Journal of Physical Chemistry C 2010, 114, 11358-11363, which is incorporated by reference in its entirety. The presence of the hollow lumen in HNTs has also been extensively studied regarding their drug carrier/release properties and nanoreactor potential. See, Lvov, Y. M.; Shchukin, D. G.; Mohwald, H.; Price, R. R., Halloysite clay nanotubes for controlled release of protective agents. Acs Nano 2008, 2, 814-820, Levis, S.; Deasy, P., Characterisation of halloysite for use as a microtubular drug delivery system. International Journal of Pharmaceutics 2002, 243, 125-134, and Shchukin, D. G.; Sukhorukov, G. B.; Price, R. R.; Lvov, Y. M., Halloysite nanotubes as biomimetic nanoreactors. *Small* 2005, 1, 510-513, each of which is incorporated by reference in its entirety. HNTs have low surface charge and can be well dispersed in solvents and polymers of medium to high polarity. Significant mechanical and thermal improvements have been demonstrated in starch, chitosan, gelatin, cellulose, pectin, and polyvinyl alcohol based composites. See, Gaaz, T. S.; Sulong, A. B.; Akhtar, M. N.; Kadhum, A. A. H.; Mohamad, A. B.; Al-Amiery, A. A., Properties and Applications of Polyvinyl Alcohol, Halloysite Nanotubes and Their Nanocomposites. *Molecules* 2015, 20, 22833-22847, and Rawtani, D.; Agrawal, Y., Multifarious applications of halloysite nanotubes: a review. *Rev. Adv. Mater. Sci* 2012, 30, 282-295, each of which is incorporated by reference in its entirety. To achieve their maximum potential as reinforcing agents in many applications, it is essential to control the orientation of the nanotubes and eliminate random distributions of tube orientations. The misalignment of particles will cause inefficiency in stress transfer, and cause the properties of HNT filled nanocomposites to be far below theoretical predictions. See, Song, K.; Zhang, Y.; Meng, J.; Green, E. C.; Tajaddod, N.; Li, H.; Minus, M. L., Structural polymer-based carbon nanotube composite fibers: understanding the processing—structure—performance relationship. *Materials* 2013, 6, 2543-2577, and Xie, X. L.; Mai, Y. W.; Zhou, X. P., Dispersion and alignment of carbon nanotubes in polymer matrix: A review. *Materials Science & Engineering R-Reports* 2005, 49, 89-112, each of which is incorporated by reference in its entirety. Of particular interest is the development of a facile process for producing nanocomposites in which the nanotubes are vertically aligned. Fabrication methods that produce well-controlled, out-of-plane orientations provide an opportunity to fabricate 3D reinforced nanocomposites with highly directional properties. Such nanotube arrangements, for example, can be exploited to generate well-defined nanotemplates or patterns for desirable magnetic, electrical and barrier properties in a cost-efficient way. See, Wang, Z. L., Zinc oxide nanostructures: growth, properties and applications. *Journal of Physics: Condensed Matter* 2004, 16, R829, which is incorporated by reference in its entirety.

A number of approaches have been used to control the orientation of nanotubes during processing. Hydrodynamic flow has been demonstrated to produce unidirectional cellulose, mammalian motile cilia, and carbon nanotube based materials. See, Hakansson, K. M.; Fall, A. B.; Lundell, F.; Yu, S.; Krywka, C.; Roth, S. V.; Santoro, G.; Kvick, M.; Wittberg, L. P.; Wågberg, L., Hydrodynamic alignment and assembly of nanofibrils resulting in strong cellulose filaments. *Nature communications* 2014, 5, Guirao, B.; Meunier, A.; Mortaud, S.; Aguilar, A.; Corsi, J.-M.; Strehl, L.; Hirota, Y.; Desoeuvre, A.; Boutin, C.; Han, Y.-G., Coupling between hydrodynamic forces and planar cell polarity orients mammalian motile cilia. *Nature Cell Biology* 2010, 12, 341-350, and Majumder, M.; Chopra, N.; Andrews, R.; Hinds, B. J., Nanoscale hydrodynamics: enhanced flow in carbon nanotubes. *Nature* 2005, 438, 44-44, each of which is incorporated by reference in its entirety. Aerodynamic flow has been used in fabricating one-dimensional anisotropic materials, especially considering its industrial application in air-jet fiber spinning. See, AngelovA, R., Air-jet spinning. *Advances in Yarn Spinning Technology* 2010, 315, which is incorporated by reference in its entirety. Particle alignment mechanisms in both air and aqueous flow have also been thoroughly studied in theories and simulations. See, Papthanasiou, T.; Guell, D. C., *Flow-induced alignment in composite materials*. Elsevier: 1997, which is incorporated by reference in its entirety. To date, there have been no studies demonstrating the controlled alignment of nanotubes via hydrodynamic flow in a spray coating process.

Disclosed herein is a method of making a coating comprising preparing a surface and spraying a mixture of a polymer with a plurality of nanotubes through a nozzle onto the surface. Also disclosed is a coating including a polymer composite including a polymer and a plurality of nanotubes aligned vertically to a surface. The polymer composite can be reinforced by controlling the orientation of nanotubes. In certain embodiments, the fiber in polymer matrix can be oriented parallel to loading direction (i.e. vertical to the surface) by a spray coating process. A spray coating process was used to control hydrodynamic flow to align the nanotubes. At the same time the elevated levels of viscosity in nanotubes suspensions preserved the nanotube orientations upon impacting the substrate surface.

In certain embodiments, halloysite nanotube-filled epoxy composites can be fabricated using spray-coating methods. The halloysite nanotubes (HNTs) can be aligned by the hydrodynamic flow conditions at the spray nozzle, and the polymer viscosity can help to preserve this preferential orientation in the final coatings on the target substrates. Electron microscopy demonstrated a consistent trend of higher orientation degree in the nanocomposite coatings as viscosity increased. The nanoindentation mechanical performances of these coatings were studied using a Hysitron TriboIndenter device. Composites showed improvements up to ~50% in modulus and ~100% in hardness as compared to pure epoxy, and the largest improvements in mechanical performance correlated with higher alignment of HNTs along the plane normal direction. This study has revealed favorable levels of anisotropic mechanical properties, mainly induced by particle orientation. Achieving this nanotube alignment using a simple spray-coating method suggests potential for large-scale production of multifunctional anisotropic nanocomposite coatings on a variety of rigid and deformable substrates.

Characterization of the Halloysite Nanotubes

Figure 1B:
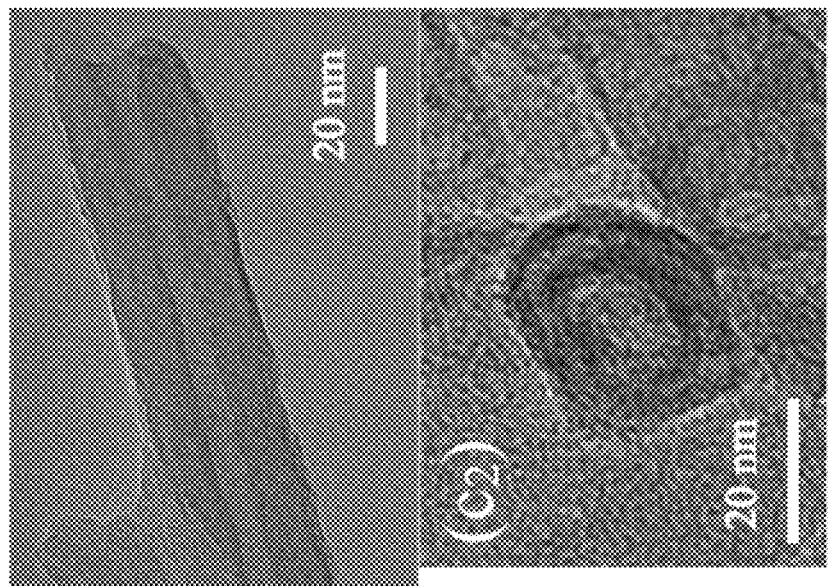
FIG. 1B shows SEM image of HNTs.
Figure 1B:
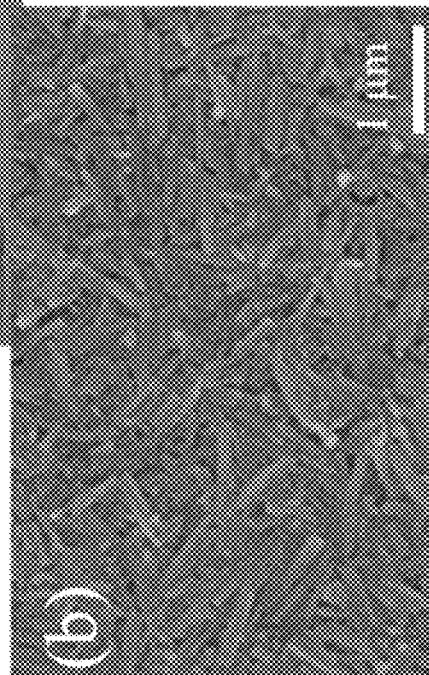
Figure 1E:
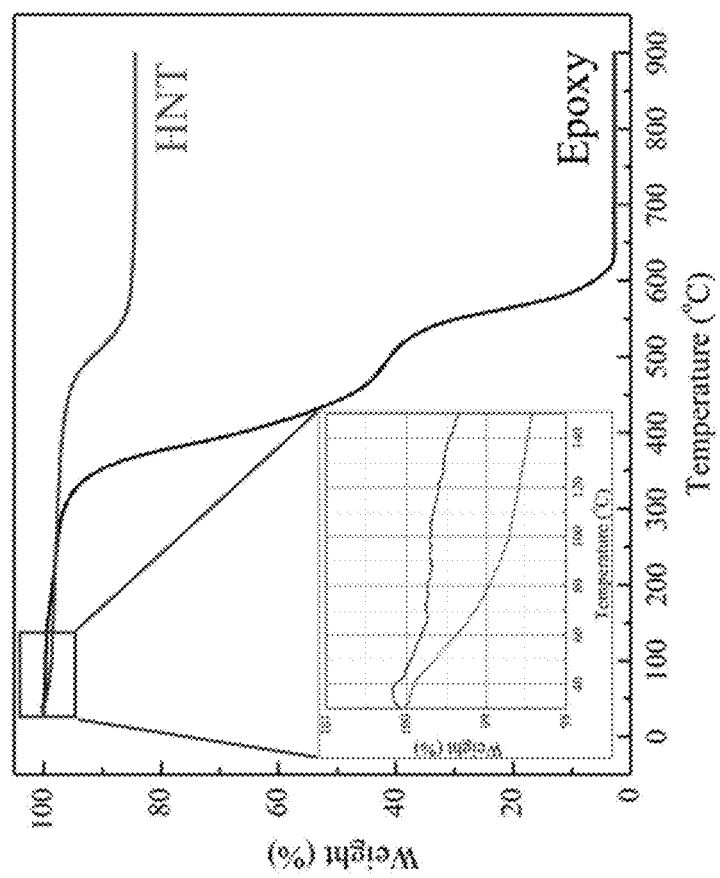
FIG. 1E shows TGA of pure epoxy and HNT.
Figure 1D:
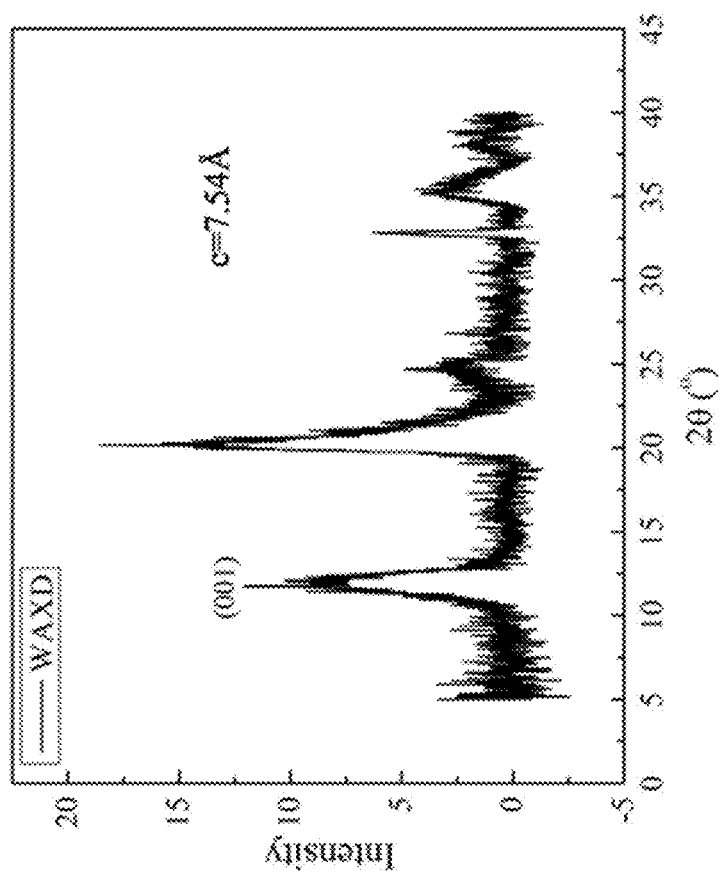
FIG. 1D shows WAXD of HNT powder with interlayer of 0.7 nm showing a dehydrated structure.

The as-obtained halloysite nanotubes were characterized using a variety of methods to determine their physical and chemical properties. FIG. 1A shows the schematic crystal structure associated with the aluminosilicate composition of halloysite nanotubes, the outer layer is silica and the inner layer is alumina. The halloysite nanotubes used in this work have inner diameters of ~15 nm, outer diameters of ~40 nm, length ~2 microns, and an average aspect ratio of around 50, as shown in FIG. 1B. The rolled-up structure is clearly shown in FIG. 1C. The inter-layer spacing of ~0.7 nm was confirmed by WAXD measurements (FIG. 1D). See, Joussein, E.; Petit, S.; Churchman, J.; Theng, B.; Righi, D.; Delvaux, B., Halloysite clay minerals—a review. *Clay Minerals* 2005, 40, 383-426, which is incorporated by reference in its entirety. Based on this number and the inner/outer diameter, the average number of layers in these HNTs was calculated to be around 17. A moisture content in ambient conditions of about 1.5 wt % (insert in FIG. 1E) was determined using thermogravimetric analysis (TGA). The HNTs showed stepwise thermal transitions centered around 150 and 500° C. The first transition is associated with the loss of freestanding water (surface and interlayer), and the second is assigned to dehydroxylation towards metakaolin, $Al_2Si_2O_7$. A pristine HNT is $Al_2Si_2O_5(OH)_4 \cdot n(H_2O)$, where n=0 for the dehydrated form and n=2 for the hydrated form. This phase transformation as well as thermal stability can be seen from TGA experiments. FIG. 1E shows the thermal profile of the HNTs and the pure epoxy used in this study as a comparison from room temperature up to 900° C. The final degradation residue for the HNTs is 84.5 wt % and for epoxy is 2.8 wt % in FIG. 1E.

Process for Producing Epoxy/HNTs Composites

Figure 2:
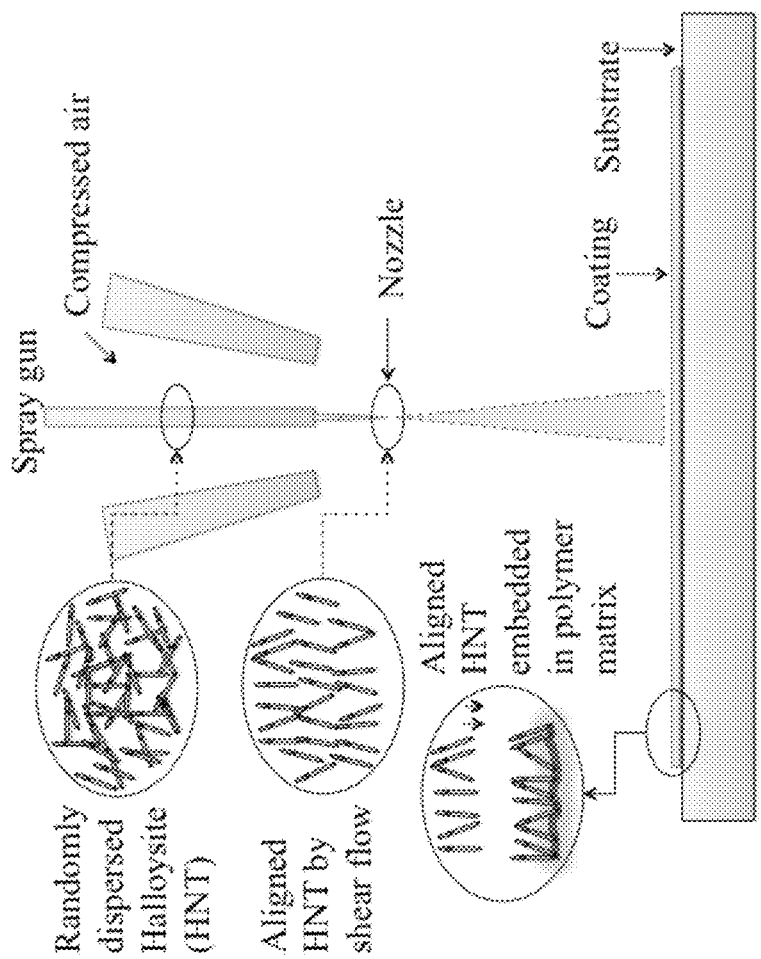

HNT filled epoxy composites were prepared using a simple spray coating technique, as shown in FIG. 2. Batch suspensions of mixed epoxy/acetone/HNT are sprayed out of a spraying gun, and compressed air facilitates HNT alignment in the hydrodynamic flow. The viscosity of epoxy/acetone constrains the movement of HNT and preserves their preferential orientations. The particles upon exiting the spraying nozzle were accelerated in a gas stream and aligned along the flow. The particle movement was constrained within the viscous polymer fluid as the liquid suspension impacted the surface of the substrate. Two parameters, namely the viscosity of the polymer suspension and particle concentration, were studied to determine their influence on the particle alignment within the polymer matrix.

Figure 3:
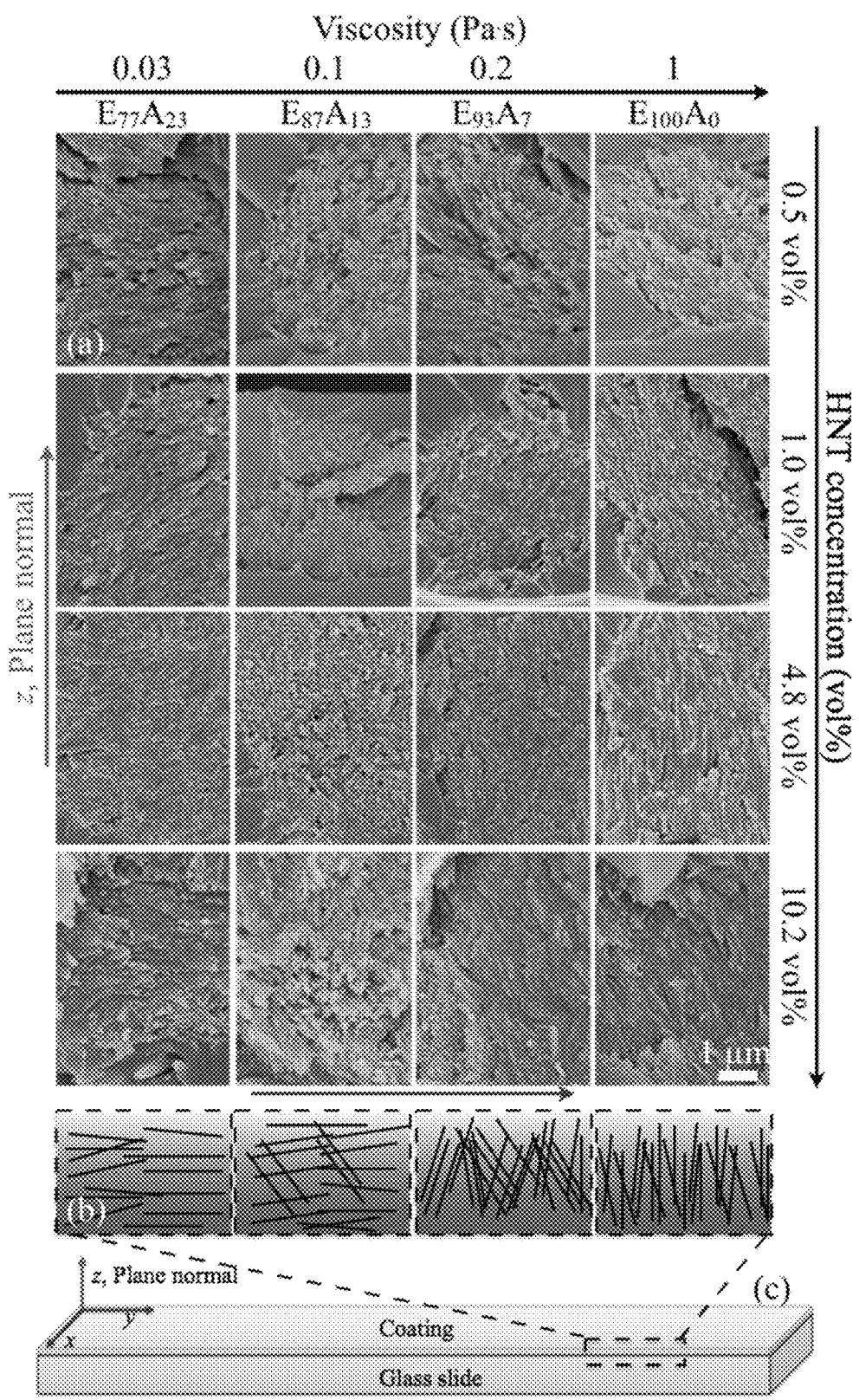
FIG. 3, section (a) shows SEM imaged morphologies of cryo-fractured surfaces in coating films containing various concentrations of HNT.

The SEM images of FIG. 3 show that the alignment of HNTs along the plane-normal direction in the sprayed composites increases with increasing viscosity of the liquid suspension. The addition of acetone in spray coating decreases the viscosity, and can improve the ease of processing through high spraying speeds and more continuous ejection of liquid suspensions under the same pressure. However, in this study the decreased viscosity weakens the constraining of HNTs in as-sprayed films and the flow-induced orientation that develops at the nozzle exit is not maintained in the composites processed from low viscosity suspensions. As shown in FIG. 3, all HNTs in $E_{77}A_{23}$ (23 vol % acetone and viscosity of 0.03 Pa.$) based composites are horizontally oriented within the coating plane direction; in contrast, when samples were sprayed from pure epoxy-based $E_{100}A_0$ suspensions (0 vol % acetone and viscosity of 1 Pa·s), the alignment of HNTs changes from in-plane orientations towards the plane-normal direction (z-axis as labeled in FIG. 3, section (c).

Figure 4:
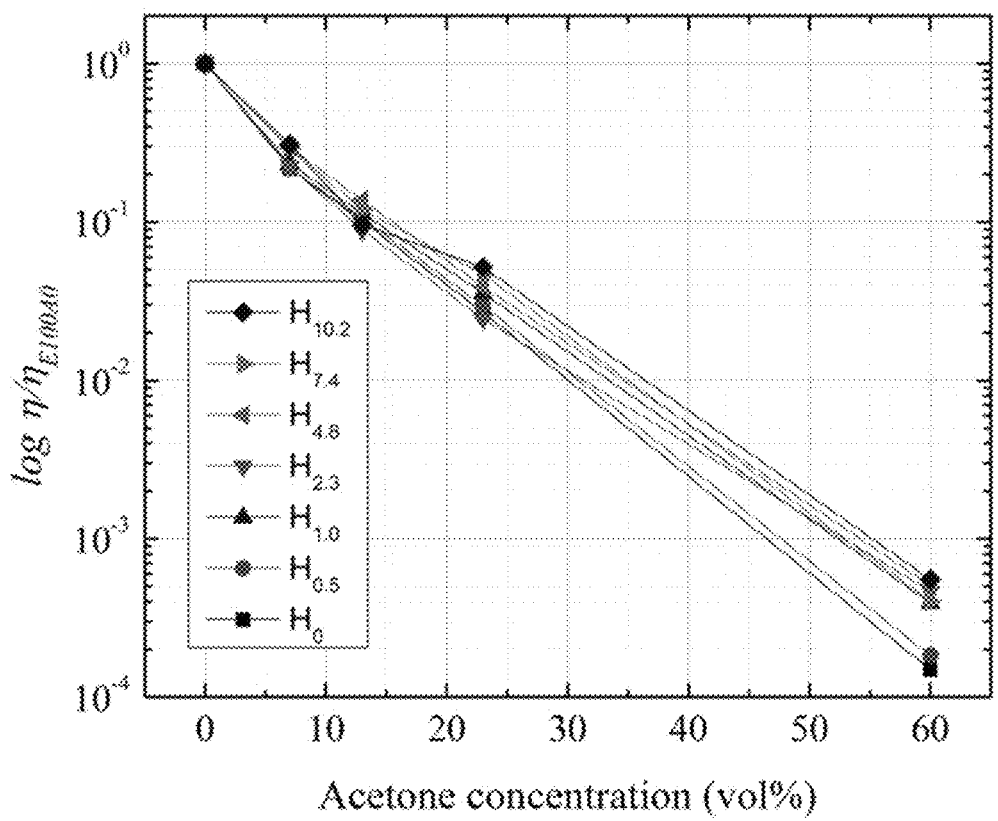
FIG. 4 shows normalized viscosity values of various epoxy/acetone/HNT suspensions.

As noted above, viscosity plays a significant role in the degree of orientation of the halloysite nanotubes in these spray-processed coatings. As shown in FIG. 4, the addition of acetone has a very strong effect in the reduction of the solution viscosity. In contrast, the addition of HNTs led to relatively small changes in the viscosity of the suspensions. This is consistent with the observation as shown in FIG. 3. On one hand, an increase in viscosity from 0.03 to 1 Pa·s produced composites displaying the most significant change in orientation, namely, from in-plane to out-of-plane. On the other hand, the addition of HNTs only weakly modified the degree of particle alignment.

Figure 14:
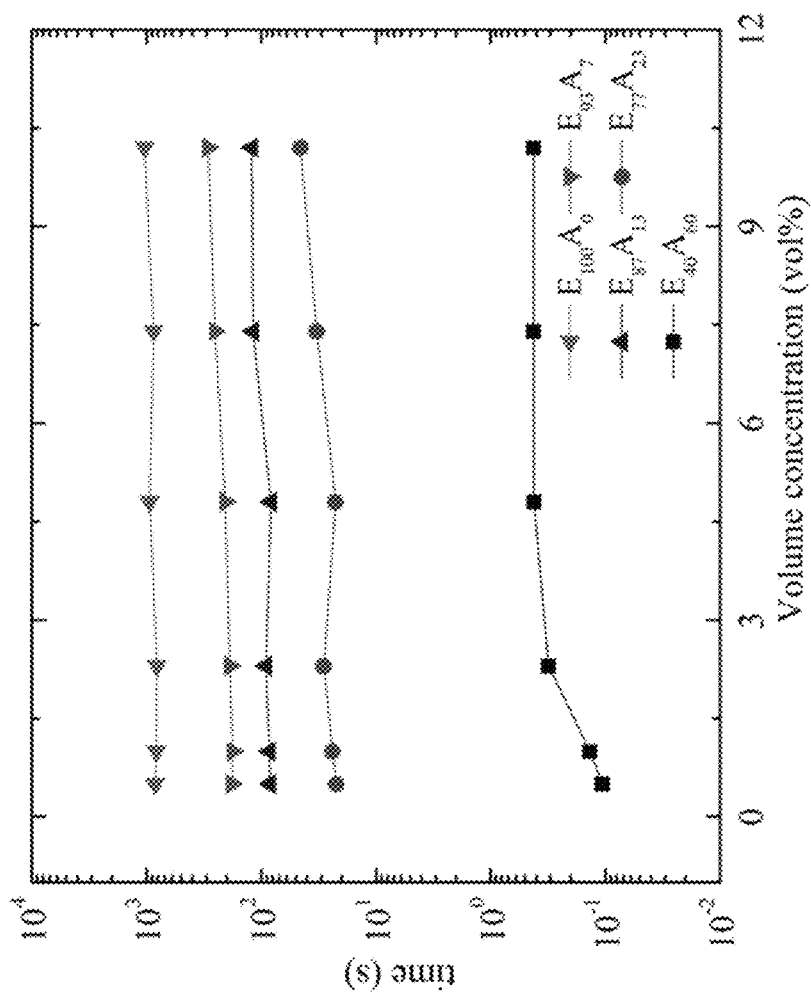
FIG. 14 shows relaxation time from vertical to horizontal alignment for a single particle.

As mentioned above, the 1D HNT nanoparticles tend to align themselves as they exit the nozzle. However, particles initially orientated out-of-plane in as-formed composites tend to relax to in-plane distributions, favoring a higher entropic state. The viscosity of the fluids used in the spraying process was the main factor that influences the timescale of this relaxation/disorientation phenomenon. Under those specific rheological scenarios (tested with shear rates of 631 s$^{-1}$ at 23° C.) as shown in FIG. 4, the time scale for halloysite to finally reach relaxed states was analyzed based on simple fluid mechanical principles. The addition of acetone to epoxy greatly lowered the viscosity; as a comparison, the increase of HNT loadings did not change the viscosity much in suspensions containing up to 10.2 vol % acetone. The analysis considers single halloysite nanotubes (diameter of 40 nm and length of 2 μm) in a Newtonian fluid (viscosity values taken from FIG. 4). External forces of gravity, buoyancy, and Stoke's drag were used to solve the equation of motion. The obtained reorientation time is plotted in FIG. 14. FIG. 14 shows relaxation time from vertical to horizontal alignment for a single particle (i.e., diameter of 40 nm and length of 2 μm and viscosity values at shear rate of 631 s$^{-1}$ were taken from FIG. 4) in various viscous fluids.

In low viscosity processing solutions containing significant amounts of acetone (i.e., $E_{40}A_{60}$) the particle relaxation time scale is on the order of 0.1 s. This short time for particle reorientation eliminates the possibility of transferring the as-sprayed coatings to a curing oven to preserve HNT orientation. On the other hand, for high viscosity processing solutions, rich in the epoxy component, it takes around 20 mins for the halloysite nanotubes to settle down, which provides a flexible time window for further processing (oven curing in the present work). It is worth mentioning that, although a single particle model was proposed in this model, the argument still holds for strongly interactive filler bundles. Improved particle alignment can be achieved by 'crowding effects' (see, Xu, M.; Futaba, D. N.; Yumura, M.; Hata, K., Alignment control of carbon nanotube forest from random to nearly perfectly aligned by utilizing the crowding effect. *Acs Nano* 2012, 6, 5837-5844, which is incorporated by reference in its entirety), that is, increasing confinement from neighboring particles will enhance the degree of particle orientation. On the other hand, as shown below, the appearance of aggregates can have a deleterious effect on composite properties even though excellent nanotube orientation is preserved.

Reinforcement of HNT in Epoxy-Based Composites

The orientation of particles greatly influences the composite properties. See, Derek Hull; Clyne, T. W., *Introduction to Composite Materials*. 2nd ed.; Cambridge University Press: Cambridge, 1996, which is incorporated by reference in its entirety. The Young's modulus (E) derived from Equation 3 based on the measured reduced modulus ($E_r$) values are plotted as a function of nanotube loadings in FIG. 5A. The measured hardness values are plotted in FIG. 5B. FIG. 5B displays consistent increasing trends with higher HNT content up to 1 vol % for formulation of specific epoxy and acetone contents. Composite properties also displayed improvements with higher epoxy content (i.e., in more viscous sprayed suspensions with less acetone content). These two mechanical properties of the sprayed and cured films composites showed significant increases from the pure epoxy control up to 1 vol %. Beyond this concentration, both modulus and hardness values displayed a plateau region, suggesting that 1 vol % represents the percolation threshold for these HNT formulations.

In the overall set of data there are modulus values that exceed the epoxy control by more than 50%. Comparable levels of enhancement in tensile modulus have been achieved for epoxy using 7.2% 3D nanosilica particles. See, Brunner, A. J.; Necola, A.; Rees, M.; Gasser, P.; Kornmann, X.; Thomann, R.; Barbezat, M., The influence of silicate-based nano-filler on the fracture toughness of epoxy resin. *Engineering Fracture Mechanics* 2006, 73, 2336-2345, which is incorporated by reference in its entirety. Carbon nanotubes, graphene and nanoclay have been added to epoxy at both low and high concentrations, and the reinforcement increases in modulus and hardness are generally between 10% and 30%. An Ashby plot is provided in the supporting information (FIG. 15) to compare systematically the current results to other studies.

Figure 6A:
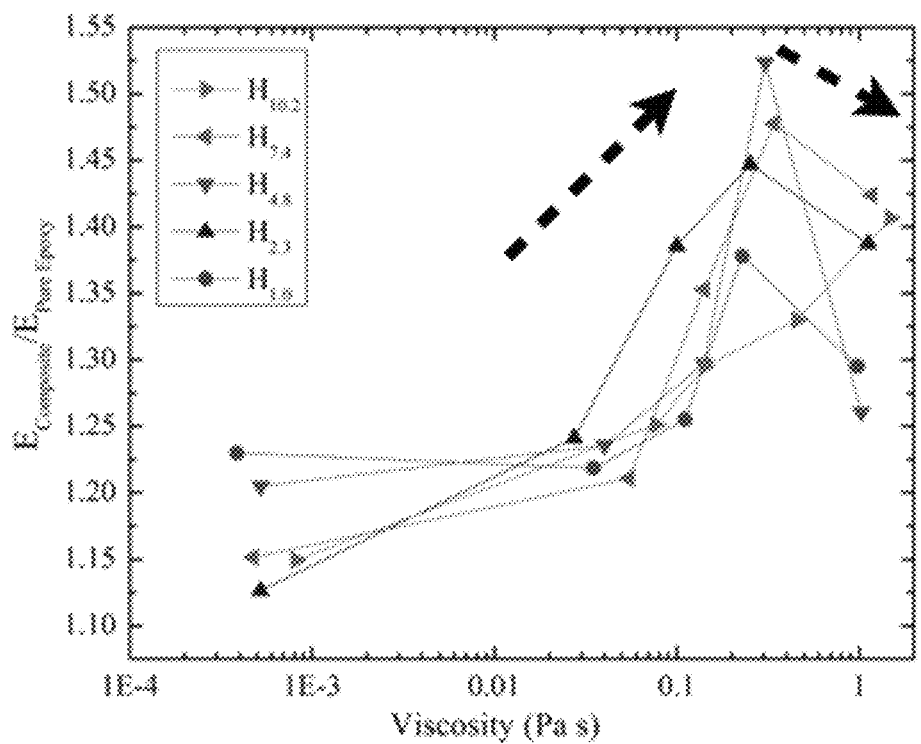
FIG. 6A shows normalized Young's modulus (E).

Because the viscosity of the spray processing fluid was shown to affect particle alignment (FIG. 3), normalized modulus and hardness values are plotted against viscosity in FIG. 6. Non-monotonic behavior is observed for both modulus and hardness. Both parameters increase with viscosity (and orientation) up to about 0.2 Pa·s (where the concentration of epoxy is about 93% of the fluid phase of the processing fluid) but a noticeable decrease in modulus and in hardness is observed when the fluid of the spray process is pure epoxy (viscosity=1 Pa·s). This drop off of properties are attributed to the appearance of significant amounts of nanotube aggregates in the highest-viscosity-processed films, an issue discussed in more detail below.

For polymer composites filled with well-dispersed tubular particles, four parameters, (i) volume fraction, (ii) particle dimension and (iii) orientation and (iv) polymer/filler interactions determine the final bulk mechanical properties. See, Halpin, J. C.; Tsai, S. W., Environmental Factors in Composite Materials Design. *U.S. Air Force Tech. Rep. AFML TR* 1967, 67-423, which is incorporated by reference in its entirety. A balance of these parameters is needed to achieve stiffer and stronger properties in composites. In the present work the influence of item (iv) is ignored. Polymer-filler interactions should be unchanged in the entire set of cured films since the surface chemistry of the as-received halloysite filler was not modified. On the other hand, the presence of some acetone in the processing fluid is apparently needed to ensure good HNT dispersion; as mentioned above, processing from pure epoxy fluid resulted in significant nanotube aggregation.

To examine the role of orientation, concentration and particle dimension on modulus and hardness for the set of nanocomposites, the Cox-Krenchel model (See, Cox, H., The elasticity and strength of paper and other fibrous materials. British *Journal of Applied Physics* 1952, 3, 72, which is incorporated by reference in its entirety) was employed, which is modified from the rule-of-mixture (see Derek Hull; Clyne, T. W., *Introduction to Composite Materials.* 2nd ed.; Cambridge University Press: Cambridge, 1996, which is incorporated by reference in its entirety), considering volume effects, length efficiency and orientation factor in reinforcement.

$$E_c = E_m V_m + \eta_l \eta_o E_f V_f \quad \text{(Equation 1)}$$

Figure 16A:
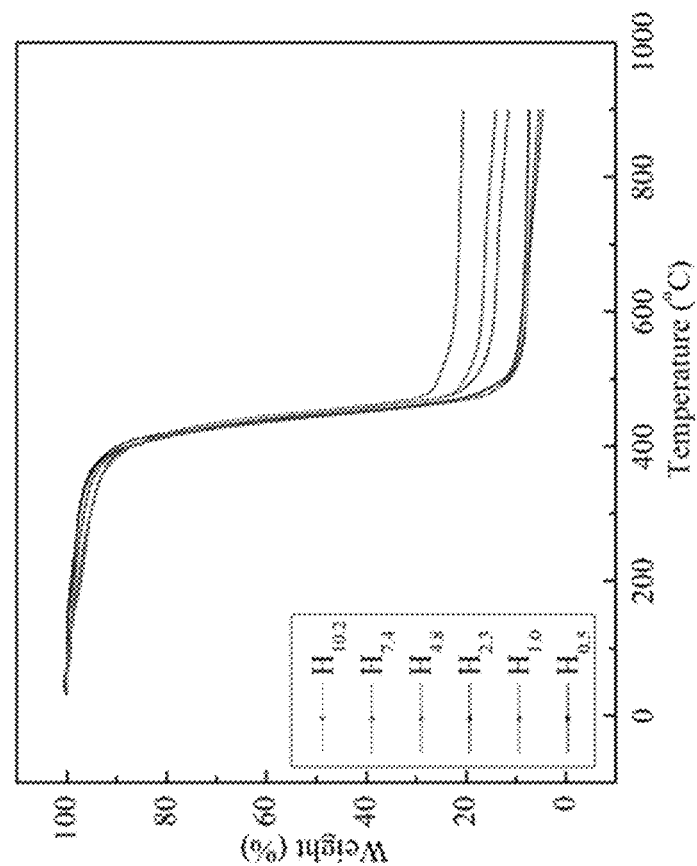
FIG. 16A shows TGA of composites with various HNT concentrations.
Figure 16B:
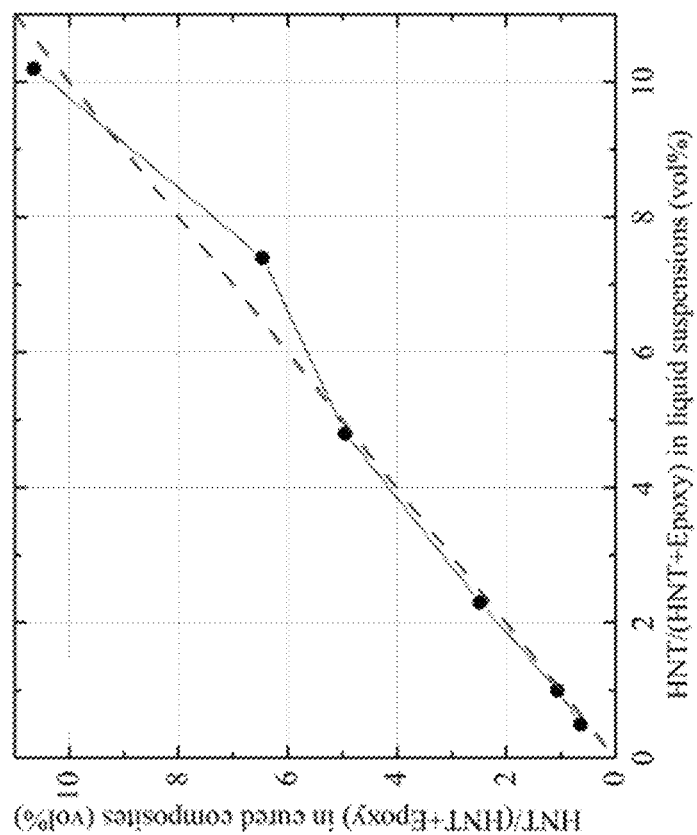
FIG. 16B shows the relationship of HNT concentration between experimental design and actual values in the final cured composites.
Figure 16C:
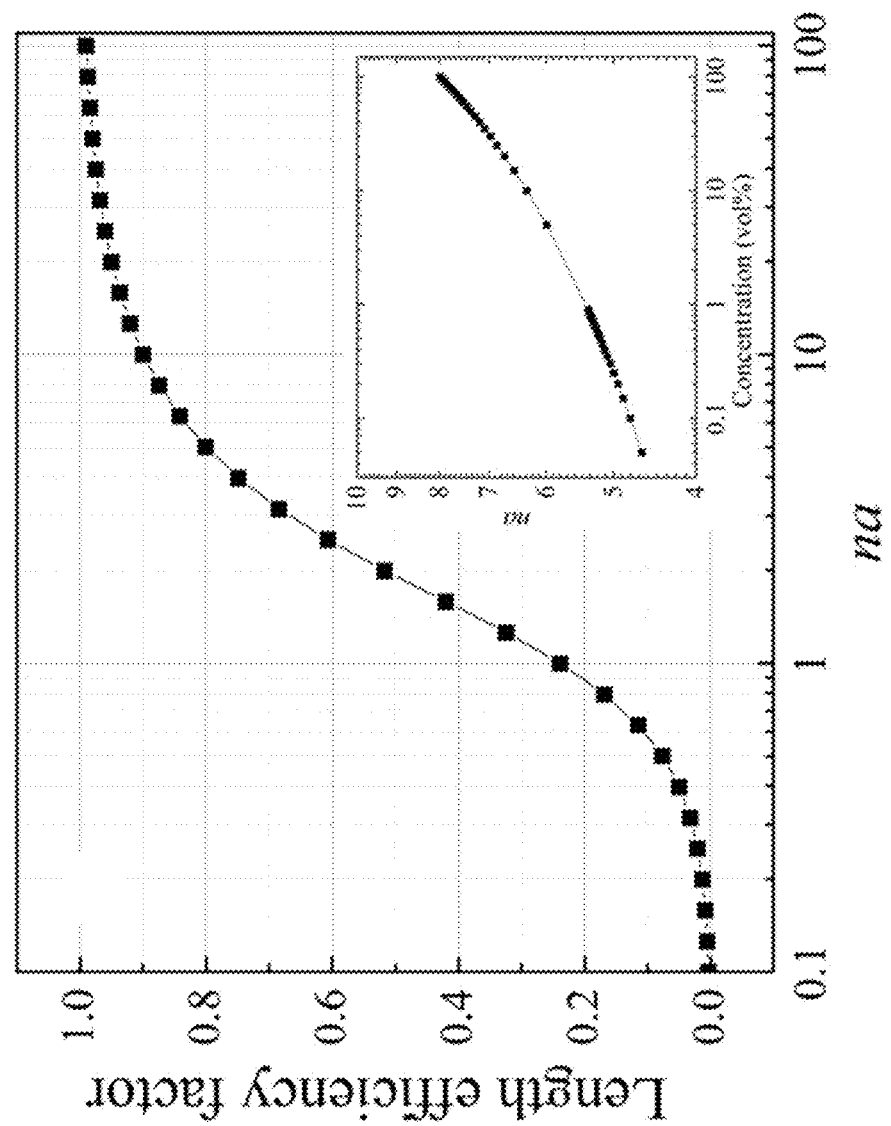
FIG. 16C shows length efficiency factor ($\eta_1$) as a function of parameter na.

In Equation 1 E and V represent the modulus and volume fraction for epoxy matrix (i.e., $E_m$ and $V_m$) and HNT fillers (i.e., $E_f$ and $V_f$). Here length efficiency factor, and orientation efficiency factor, $\eta_o$, were defined based on shear lag theory and Krenchel's method. See, McCrum, N. G.; Buckley, C. P.; Bucknall, C. B., *Principles of Polymer Engineering.* 2rd ed.; Oxford University Press, USA: 1997; p 276-278, and Cox, H., The elasticity and strength of paper and other fibrous materials. *British Journal of Applied Physics* 1952, 3, 72, each of which is incorporated by reference in its entirety. The length efficiency for particles with specific aspect ratio depends only on volume fraction and these length efficiency values were very similar in all of the composites (i.e., 81% to 86% as shown in FIGS. 16A-16C). Therefore, the analysis of orientation factor in the following section will expose the most significant influence on the mechanical properties.

Orientation Factor from Statistics

Figure 5A:
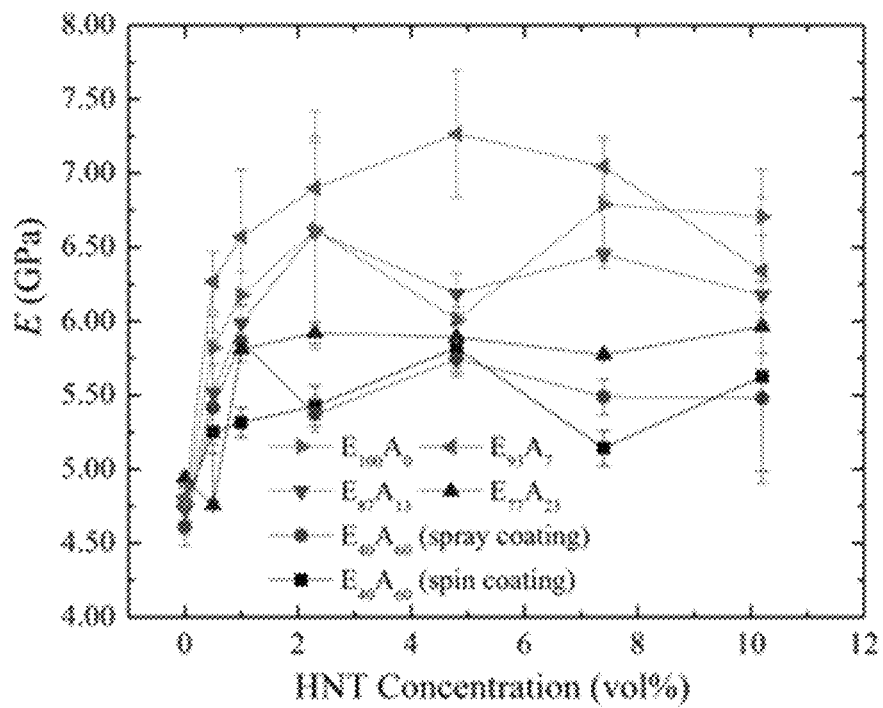
FIG. 5A shows Young's modulus (E).
Figure 5B:
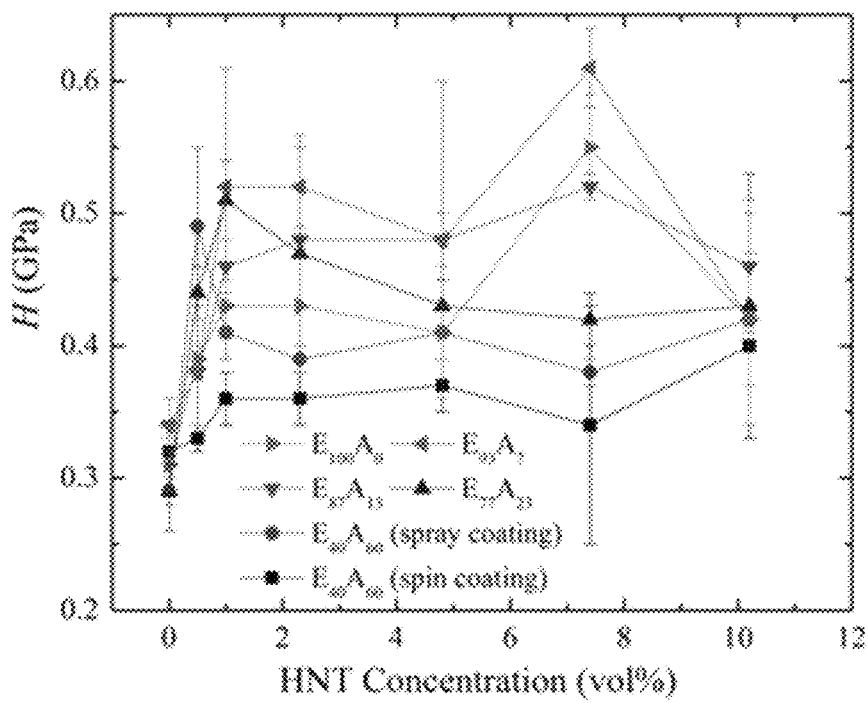
FIG. 5B shows hardness values from indentation tests in cured epoxy/HNT composites.
Figure 17:
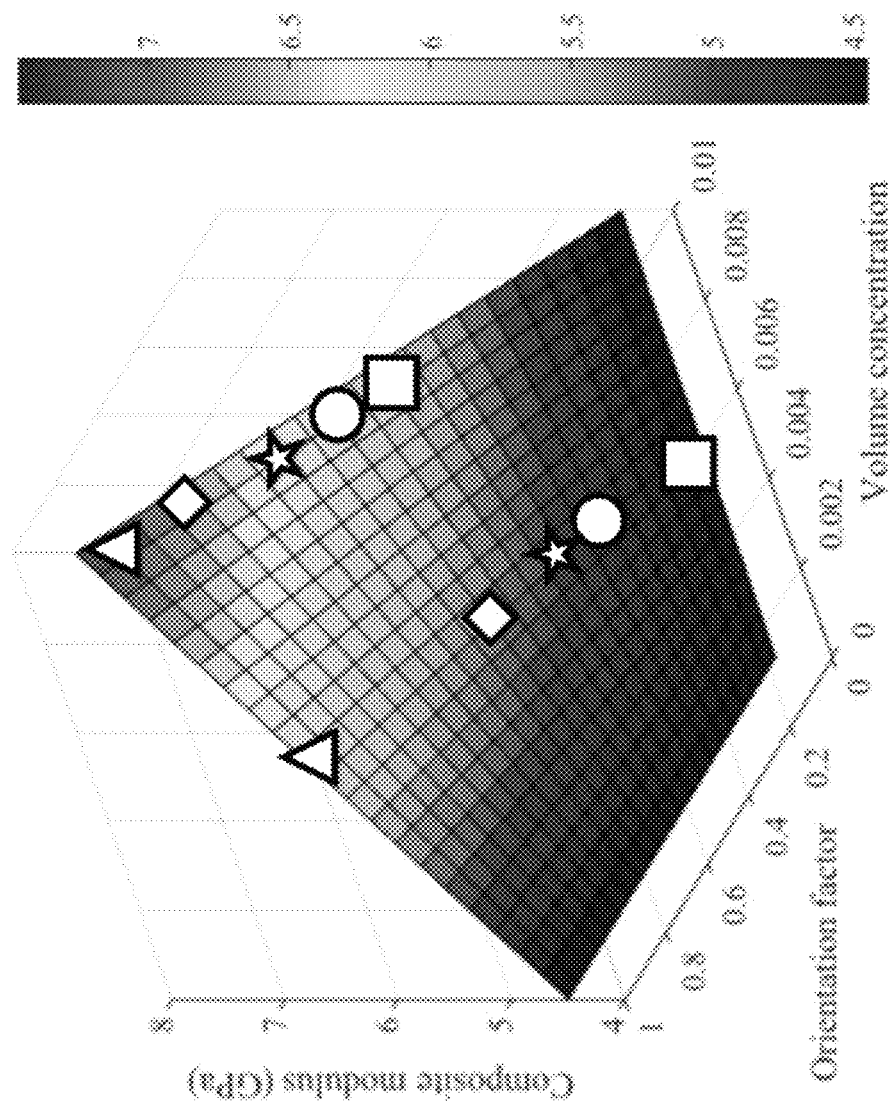
FIG. 17 shows contour of composite elastic modulus from Cox-Krenchel model with orientation factor and volume fraction variations.

As shown in FIGS. 5A and 5B, composites prepared from different viscous formulations showed increases in both modulus and hardness values up to 1 vol %. However, at any given HNT concentration in the plateau region above 1 vol %, there is dependence on the details of the formulation composition and on the method of processing, spray coating vs. spin coating (FIGS. 5A and 5B). These property differences are attributed to HNT orientations in the final composite coatings (as shown in FIG. 17 and Table 4). FIG. 17 shows composite moduli at various volumes (i.e., 0.5 vol % and 1.0 vol %) showed the orientation factor trend distinctively. Composites based on $E_{40}A_{60}$ (○), $E_{77}A_{23}$ (□) $E_{87}A_{13}$ (☆), $E_{93}A_7$ (Δ), and $E_{100}A_0$ (◊) are marked.

A useful formalism for the analysis of orientation in composite mechanics is Krenchel orientation factor, $\eta_o$, defined in the following Equation 2, $$\eta = \frac{\int_0^{\frac{1}{2}\pi} I(\varphi)\cos^4\varphi \, d\varphi}{\int_0^{\frac{1}{2}\pi} I(\varphi) d\varphi} \quad \text{(Equation 2)}$$

Figure 7:
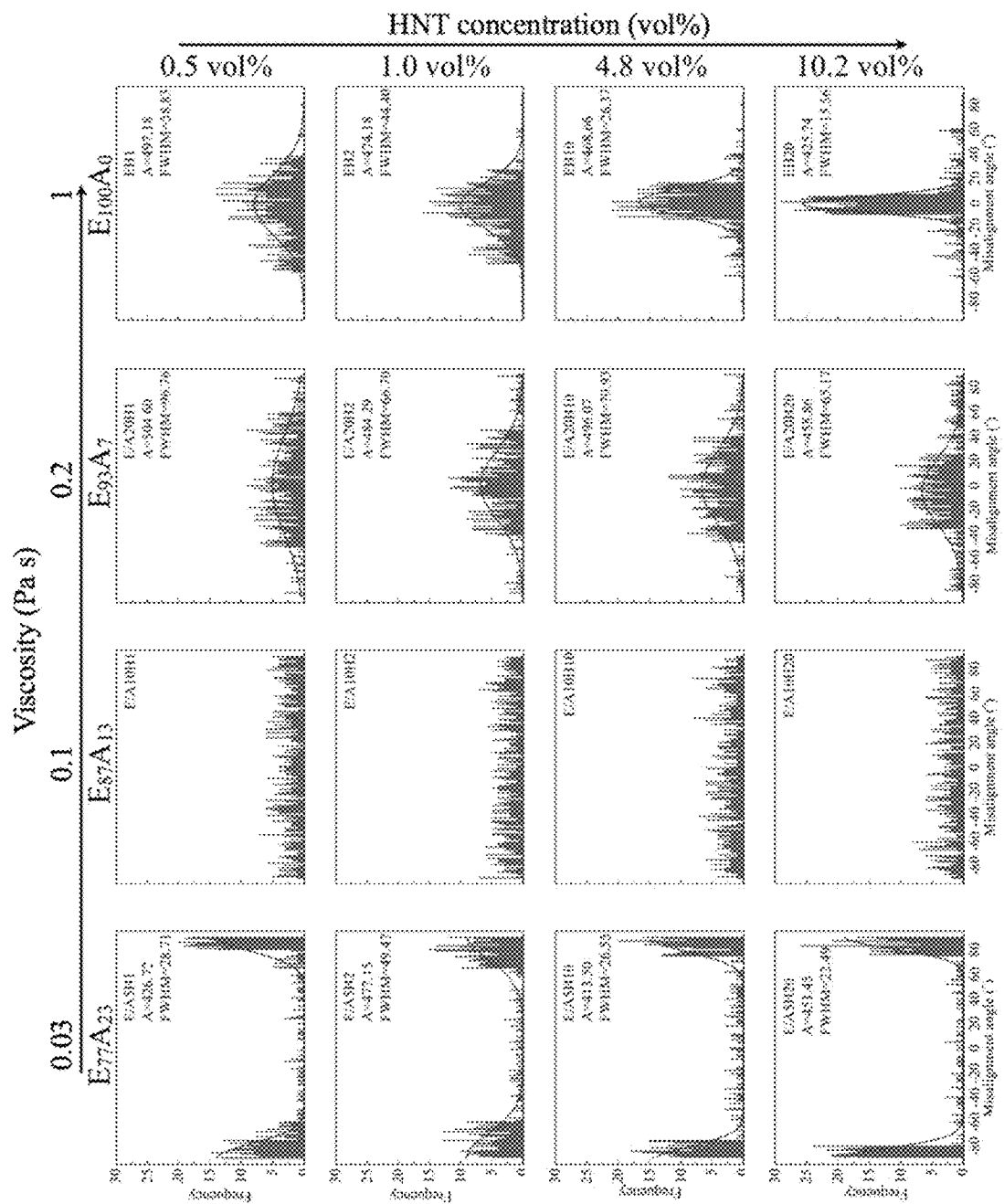
FIG. 7 shows histogram of HNTs degree of misalignment along plane-normal direction (z-axis in FIG. 4) in cured epoxy/HNT composites containing various concentrations of HNT.

As defined above, $\eta_o$ can be obtained if $I(\varphi)$ is known. It is often assumed that the distribution of rods, $I(\varphi)$ as a function of co, can be described by a Gaussian or Lorentzian distribution. $\eta_o$ is 0 for particles oriented perpendicular to the loading axis (two-dimensional randomness in plane), 1 for perfect orientation along the loading direction and 0.325 for three-dimensional randomly distributed particles. In previous studies $I(\varphi)$ has been measured using polarized light microscopy, Raman spectroscopy, X-ray diffraction, X-ray scattering, and Raman scattering techniques. See, Derek Hull; Clyne, T. W., *Introduction to Composite Materials.* 2nd ed.; Cambridge University Press: Cambridge, 1996, Young, K.; Blighe, F. M.; Vilatela, J. J.; Windle, A. H.; Kinloch, I. A.; Deng, L.; Young, R. J.; Coleman, J. N., Strong Dependence of Mechanical Properties on Fiber Diameter for Polymer-Nanotube Composite Fibers: Differentiating Defect from Orientation Effects. *ACS Nano* 2010, 4, 6989-6997, Blighe, F. M.; Young, K.; Vilatela, J. J.; Windle, A. H.; Kinloch, I. A.; Deng, L.; Young, R. J.; Coleman, J. N., The Effect of Nanotube Content and Orientation on the Mechanical Properties of Polymer-Nanotube Composite Fibers: Separating Intrinsic Reinforcement from Orientational Effects. *Adv. Funct. Mater* 2011, 21, 364-371, Song, K.; Zhang, Y.; Meng, J.; Minus, M. L., Spectral analysis of lamellae evolution and constraining effects aided by nano-carbons: A coupled experimental and simulation study. *Polymer* 2015, 75, 187-198, Pichot, V.; Badaire, S.; Albouy, P.; Zakri, C.; Poulin, P.; Launois, P., Structural and mechanical properties of single-wall carbon nanotube fibers. *Physical Review B* 2006, 74, 245416-8, Chen, M.; Guthy, C.; Vavro, J.; Fischer, J. E.; Badaire, S.; Zakri, C.; Poulin, P.; Pichot, V.; Launois, P. In *Characterization of Single-walled Carbon Nanotube Fibers and Correlation with Stretch Alignment*, MRS Proceedings, Cambridge Univ Press: 2004; p HH4. 11, and Zhou, W.; Vavro, J.; Guthy, C.; Winey, K. I.; Fischer, J. E.; Ericson, L. M.; Ramesh, S.; Saini, R.; Davis, V. A.; Kittrell, C., Single wall carbon nanotube fibers extruded from super-acid suspensions: Preferred orientation, electrical, and thermal transport. *Journal of applied physics* 2004, 95, 649-655, each of which is incorporated by reference in its entirety. The misalignment histogram (FIG. 7) was used to compute the Krenchel orientation factors. 500 nanotube orientations were taken on around 15 fracture surfaces for each sample and processed using ImageJ software. Gaussian fitting using Origin 8.5 was conducted based on the fact that the fitted peak center is 0° for out-of-plane aligned particles and 90° for in-plane aligned particles.

To generate a more quantitative understanding of the HNTs' out-of-plane misalignments in the spray-processed composite films, statistical analyses of the SEM images were conducted using Origin software (Table 4). The statistical information was plotted and fitted in FIG. 7. Assuming Gaussian distribution of HNTs orientations and no bias in out-of-plane orientation, the mean angle for in-plane orientation should be 90° and out-of-plane orientation should be 0°. The fitted values of full-with at half-maximum (FWHM) suggest the deviations from average alignment. For $E_{77}A_{23}$, $E_{93}A_7$ and $E_{1000}A_0$ based HNT composites, it is possible to fit values to a Gaussian distribution function. The fact that $E_{87}A_{13}$ samples cannot be fitted is due to the purely random particle distributions. The fitted normal function center of $E77A_{23}$ samples was located at ±90° which indicates that the retardation of alignment loss provided by viscosity is weaker than gravitational effects and Brownian motion, as described above in FIG. 3. Consequently, HNTs are essentially distributed parallel to in-plane x-y axes in this low-viscosity sample. Comparatively, the HNTs concentration also influenced particle alignment, as higher concentration associated with narrower fitted peaks. This observation demonstrates again an effective route for controllable orientation, from perfect parallel to vertical, by varying the viscosity.

TABLE 1

HNTs dimensions, length efficiency ($\eta_l$), orientation factor ($\eta_o$), particle efficiency factor ($\eta$), and calculated HNT modulus from Cox-Krenchel model for composites with HNT concentrations lower than 1 vol %.

| Spraying solution batch | Efficiency parameters | | | Effective reinforcement (GPa) | | Intrinsic mechanics (GPa) | |
|---|---|---|---|---|---|---|---|
| | $\eta_l$ | $\eta_o$ | $\eta = \eta_l\eta_o$ | $\eta \cdot E_{eff}$ | $\eta \cdot H_{eff}$ | $E_{eff}$ | $H_{eff}$ |
| $E_{87}A_{13}$ | 0.83 | 0.37 | 0.31 | 131 | 12 | 420.97 | 37.74 |
| $E_{93}A_7$ | 0.83 | 0.64 | 0.54 | 182 | 9 | 336.67 | 16.67 |
| $E_{100}A_0$ | 0.83 | 0.83 | 0.69 | 154 | 12 | 223.04 | 16.96 |

Figure 8A:
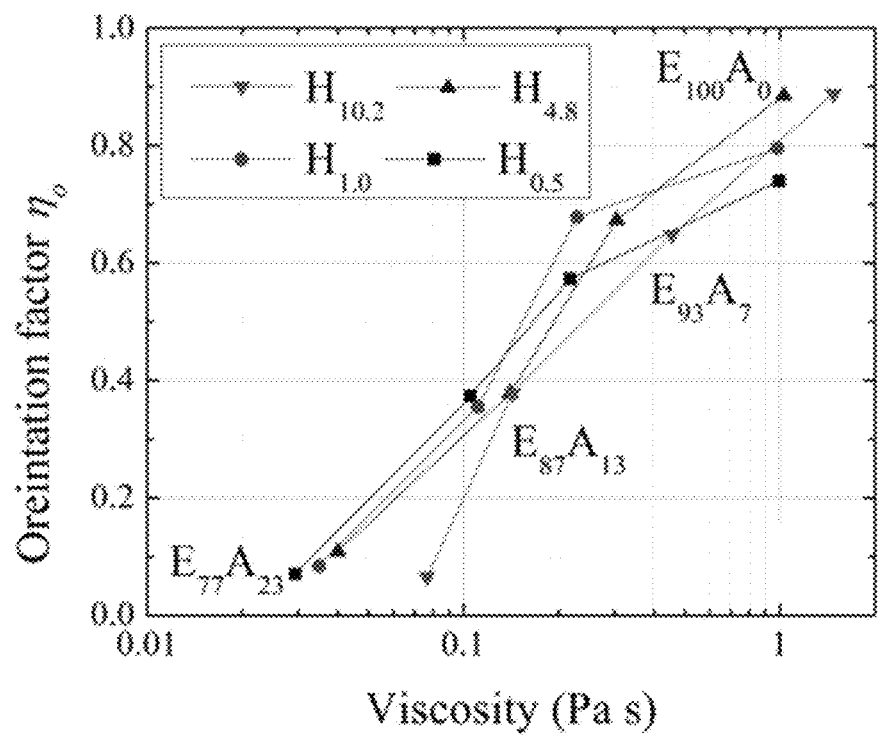
FIG. 8A shows Krenchel orientation factor, $\eta_o$.
Figure 8B:
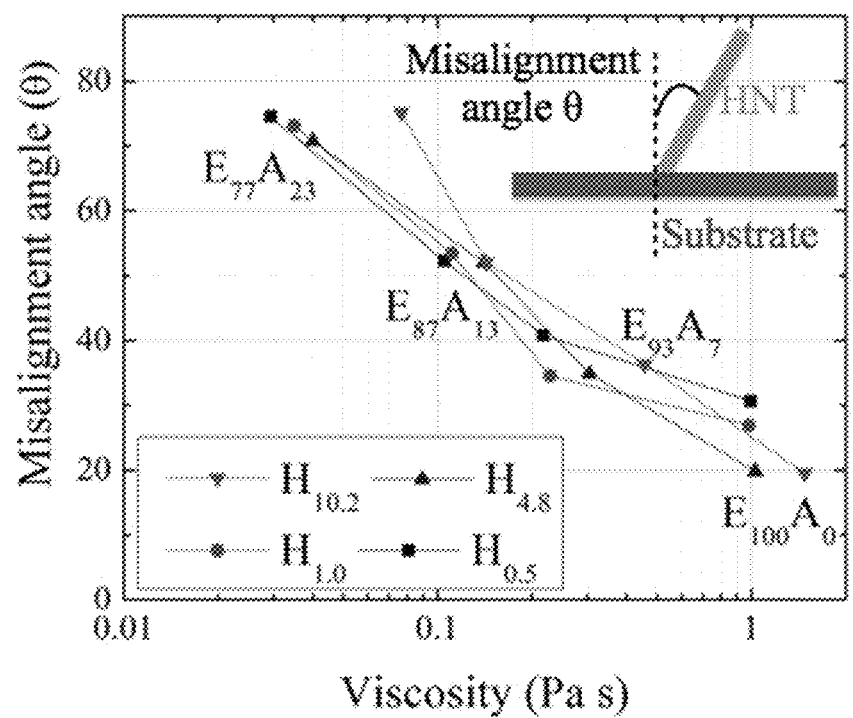
FIG. 8B shows misalignment angle, $\theta$, for composites listed in FIG. 7.
Figure 8C:
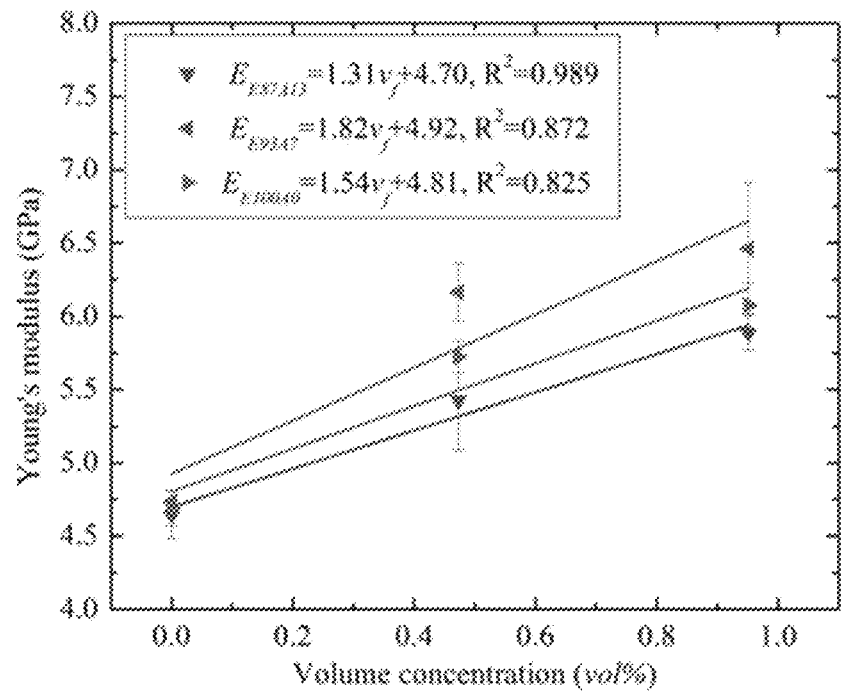
FIG. 8C shows linear fitting of composites modulus.
Figure 8D:
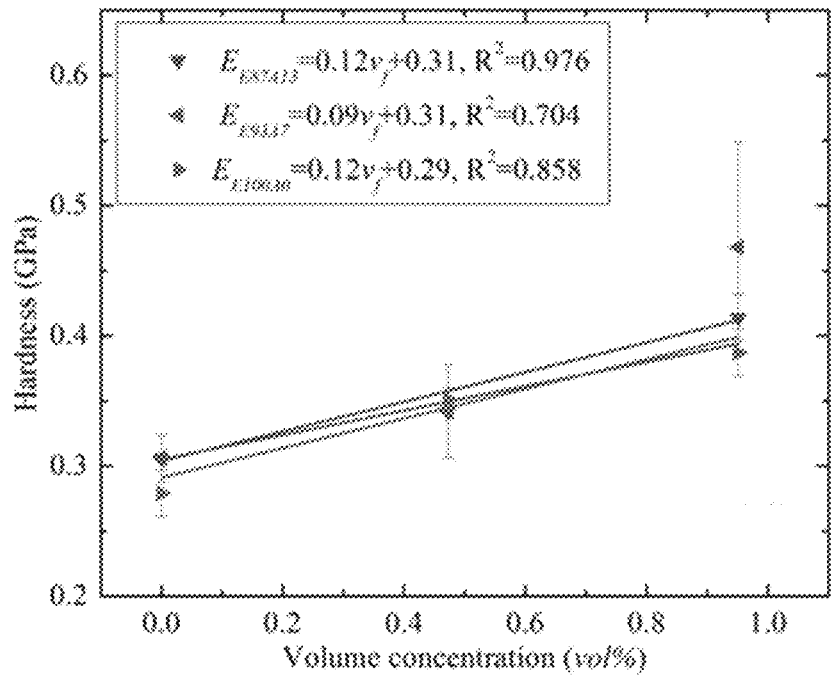
FIG. 8D shows hardness values.

Now that all the length efficiency and orientation factor parameters have been obtained, the particle intrinsic mechanical properties are accessible based on Equation 1. The effective reinforcements in modulus and hardness have been fitted and plotted in FIGS. 8C and 8D and values also listed in Table 1. Linear fitting of composites modulus (FIG. 8C) and hardness values (FIG. 8D) showed coherent trends. The closer the fitted curve to the experimentally measured data points, the closer R-square is to the value of 1. The properties of the HNT particles derived from the three separate data sets (based on spraying of the three different formulations listed in Table 2) are reasonably consistent. Compared to the literature reports, the effective reinforcement ($\eta \cdot E_{eff}$) achieved in this work, up to 182 GPa, is between the reinforcement of carbon nanotubes (up to 417 GPa) and alumina platelets (100 GPa). See, Jalili, R.; Razal, J. M.; Wallace, G. G., Wet-spinning of PEDOT:PSS/Functionalized-SWNTs Composite: a Facile Route Toward Production of Strong and Highly Conducting Multifunctional Fibers. *Scientific Reports* 2013, 3, 3438, and Erb, R. M.; Libanori, R.; Rothfuchs, N.; Studart, A. R., Composites reinforced in three dimensions by using low magnetic fields. *Science* 2012, 335, 199-204, each of which is incorporated by reference in its entirety. It is worth mentioning that the alumina particles are aligned while the carbon nanotubes are not. If length efficiency and orientation factor are taken into consideration, the reinforcement factor for carbon nanotubes would be higher. The HNT particles in the spray coatings have reached rather high reinforcement potential. This favorable situation is largely a result of the favorable normal alignment that exists in the coatings as well as the fact that HNTs with relatively small diameters were used here (around 40 nm). As indicated previously in both experimental measurements and theoretical calculations, HNT mechanics are greatly influenced by size effects. See, Lecouvet, B.; Horion, J.; D'Haese, C.; Bailly, C.; Nysten, B., Elastic modulus of halloysite nanotubes. Nanotechnology 2013, 24, 105704-105711, and Guimaraes, L.; Enyashin, A. N.; Seifert, G.; Duarte, H. A., Structural, electronic, and mechanical properties of single-walled halloysite nanotube models. *The Journal of Physical Chemistry C* 2010, 114, 11358-11363, each of which is incorporated by reference in its entirety. For instance, HNTs with diameter of 50 nm have a high modulus of about 600 GPa while a 160 nm HNT can only reach 20 GPa.

Percolation Threshold

Figure 9A:
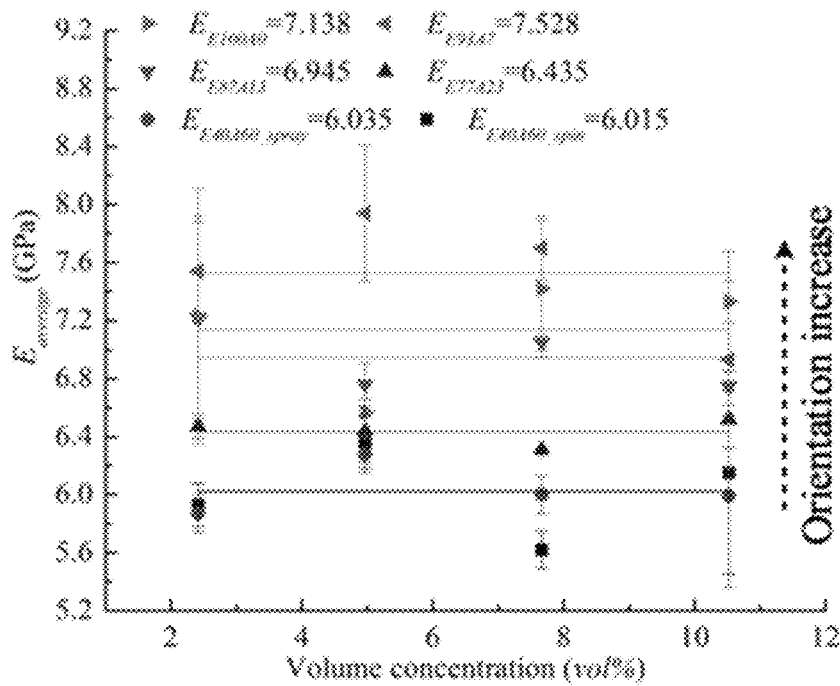
FIGS. 9A-9D show trend lines in high concentration composites showing reduced modulus (FIG. 9A), hardness (FIG. 9B), particle aspect ratio and volume fraction based regimes (FIG. 9C) and average effective modulus based on HNT bundle diameter in aggregates (FIG. 9D).
Figure 9B:
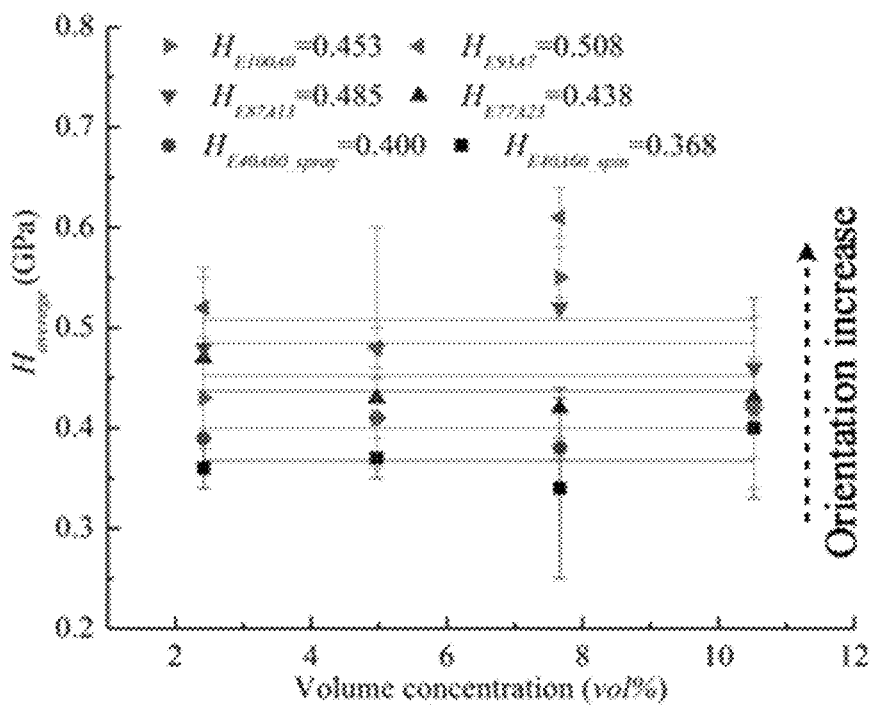

In fiber-filled polymeric composites, percolation threshold effects lead to a regime of behavior in which mechanical properties do not show a continual increase as fiber concentration increases. See, Kumar, A.; Chouhan, D. K.; Alegaonkar, P. S.; Patro, T. U., Graphene-like nanocarbon: An effective nanofiller for improving the mechanical and thermal properties of polymer at low weight fractions. *Composites Science and Technology* 2016, 127, 79-87, which is incorporated by reference in its entirety. This phenomenon has been reported in various filler loaded polymer composites, with percolation threshold values ranging from 0.5% to 5%[20]. In this study, significant improvement in both modulus and hardness values occurred up to 1 vol % (FIGS. 5A and 5B). The average values beyond this percolation threshold were calculated and plotted as trend-lines in FIGS. 9A and 9B. Similar to the phenomenon observed in lower HNT loaded composites (less than 1.0 vol %), higher orientation corresponds to more improved mechanical properties in higher HNTs concentrated composites (between 1.0 and 10.2 vol %). In addition, $E_{100}A_0$ failed out of this trend mainly due to poorer dispersion quality. This plateau region independent of HNT concentration is now examined in more detail.

Figure 9C:
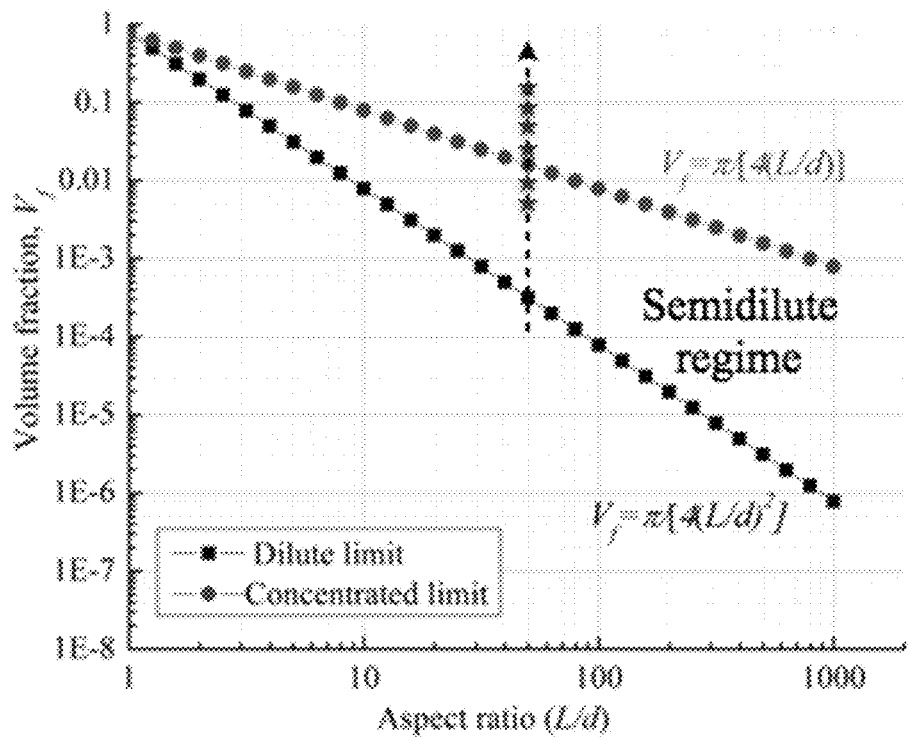
Figure 9D:
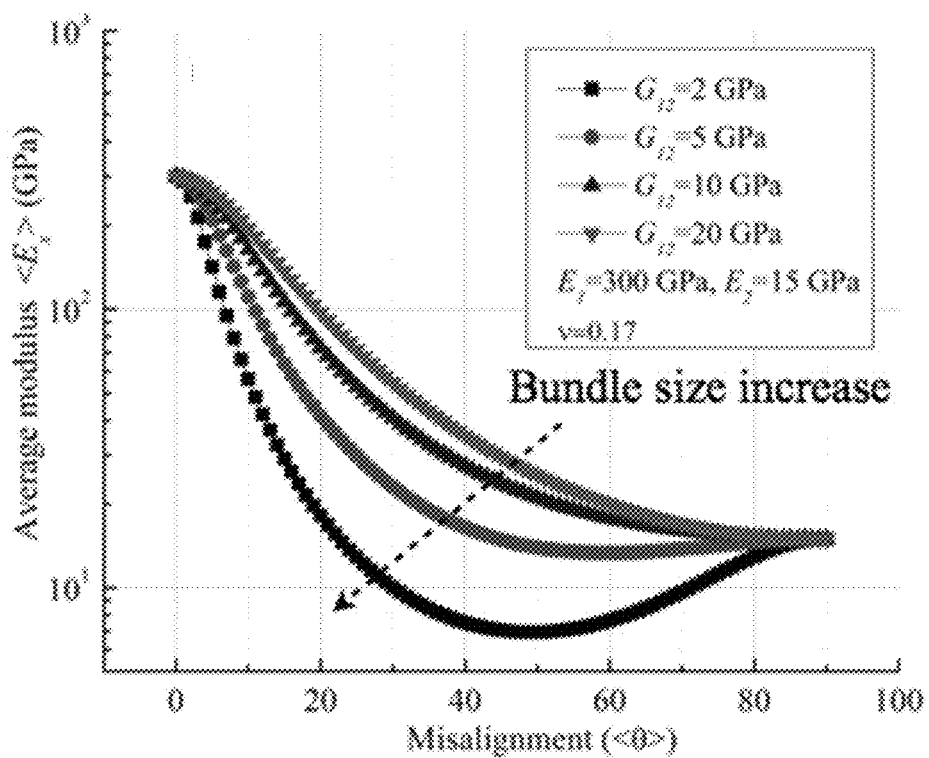
Figure 10A:
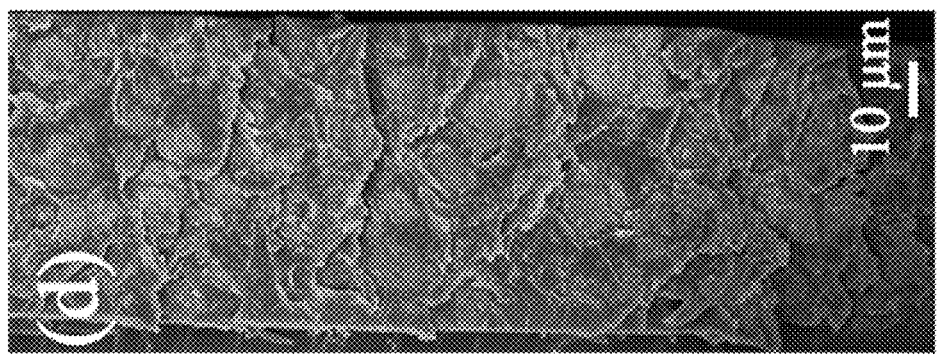
FIGS. 10A-10D show SEM images of $E_{100}A_0H_z$, with z being 0.5 vol % (FIG. 10A), 1.0 vol % (FIG. 10B), 4.8 vol % (FIG. 10C) and 10.2 vol % (FIG. 10D).
Figure 10B:
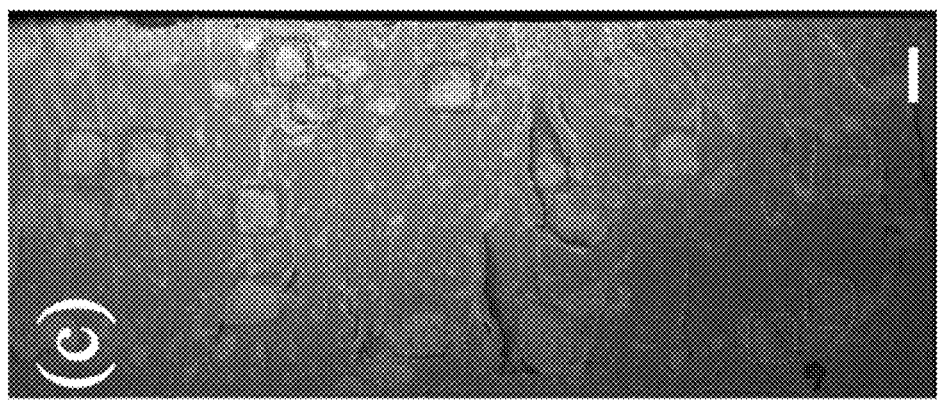
Figure 10C:
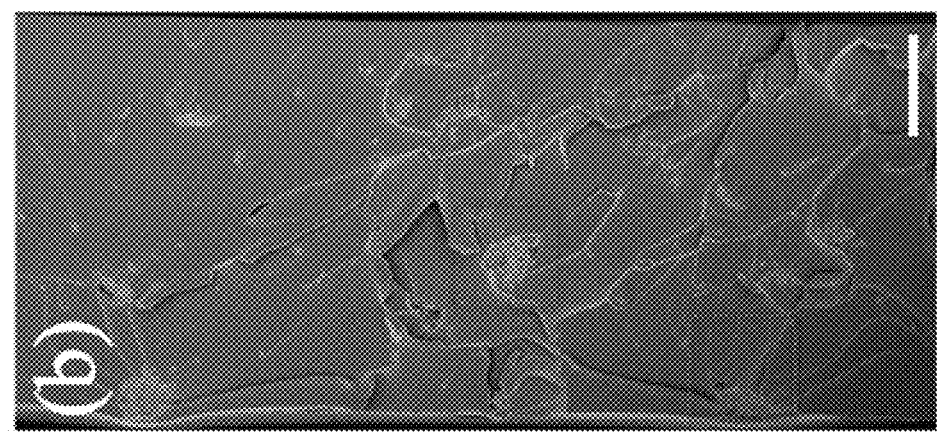
Figure 10D:
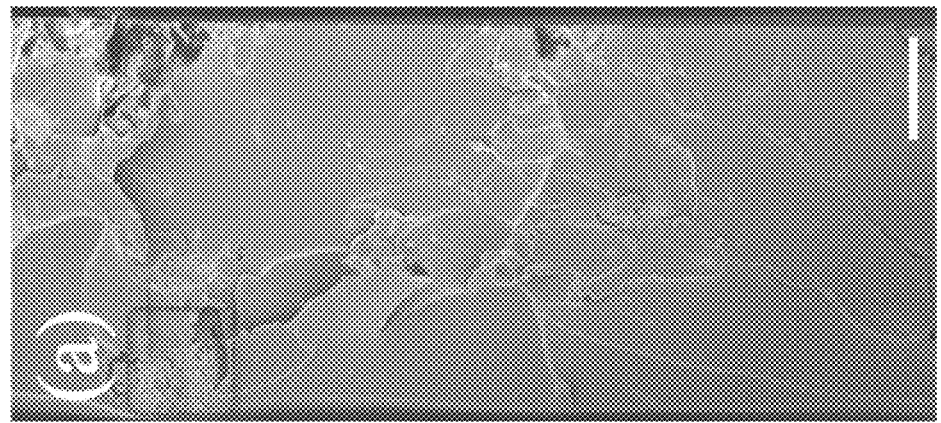

Three regimes based on the degree of particle interaction or the average distances between particles are defined in particle suspensions: dilute, semidilute, and concentrated. See, Doi, M.; Edwards, S. d., Dynamics of concentrated polymer systems. Part 1.—Brownian motion in the equilibrium state. *Journal of the Chemical Society, Faraday Transactions 2: Molecular and Chemical Physics* 1978, 74, 1789-1801, and Doi, M.; Edwards, S., Dynamics of concentrated polymer systems. Part 2.—Molecular motion under flow. *Journal of the Chemical Society, Faraday Transactions 2: Molecular and Chemical Physics* 1978, 74, 1802-1817, each of which is incorporated by reference in its entirety. The semidilute regime for HNTs in this research was between 0.01 vol % and 2 vol % (FIG. 9C). In FIG. 9C, blue stars indicate the concentrations in this study and boundary between semidilute and dilute regime is 2.0 vol %. When the HNTs concentrations reach the concentrated regime above 2.0 vol %, HNTs interact with other particles in the form of a network. These interactions among particles lead to significant amounts of agglomerates in the final composites. FIGS. 10A-10D show the increased particle aggregates size and amounts. Dispersion quality was always poorer at lower acetone concentrations (FIGS. 10E-10H; all square markers are 10 μm by 10 μm). With the increase in HNT concentration, more bundles are formed. The aggregate size also increases. Very distinguished are the 10.2 vol % composites which have the most aggregates and with bundle sizes even larger than 10 µm. As shown in FIG. 9D, the increase in HNT bundle size greatly decreases the efficiency of stress transfer. This will lead to the plateau region in Young's modulus and hardness in FIGS. 9A and 9B despite the fact that concentration increases at each of the selected liquid viscosity (along x axis of volume concentration). For fixed HNT bundle size, FIG. 9D also displayed the reductions in modulus with higher misalignment angle. This is in line with the trends of plateau increases (along y axis of modulus/hardness values in FIGS. 9A and 9B). Moreover, $E_{100}A_0$ showed lower mechanical properties than that in $E_{93}A_7$ composites. This is attributed to the dispersion quality. As a comparison, the shear modulus of HNTs with diameters ranging from 200 nm to 220 nm are 1.5±0.26 GPa, while carbon nanotubes are 6 GPa for 4.5 nm bundles, 2.3 GPa for 9 nm bundles and 0.7 GPa for 20 nm bundles. See, Salvetat, J.-P.; Briggs, G. A. D.; Bonard, J.-M.; Bacsa, R. R.; Kulik, A. J.; Stockli, T.; Burnham, N. A.; Forró, L., Elastic and shear moduli of single-walled carbon nanotube ropes. *Physical Review Letters* 1999, 82, 944-7, Satcurada, I.; Ito, T.; Nakamae, K., Elastic moduli of the crystal lattices of polymers. *Journal of Polymer Science Part C: Polymer Symposia* 1967, 15, 75-91, and Popov, V.; Van Doren, V.; Balkanski, M., Elastic properties of crystals of single-walled carbon nanotubes. *Solid State Communications* 2000, 114, 395-399, each of which is incorporated by reference in its entirety. Considering the average particle diameter of 40 nm, shear moduli were assumed to be 2, 5, 10 and 20 GPa. As expected in FIGS. 10E and 10H, the final composites showed larger-size aggregates with lower acetone content in suspension preparations.

Figure 18:
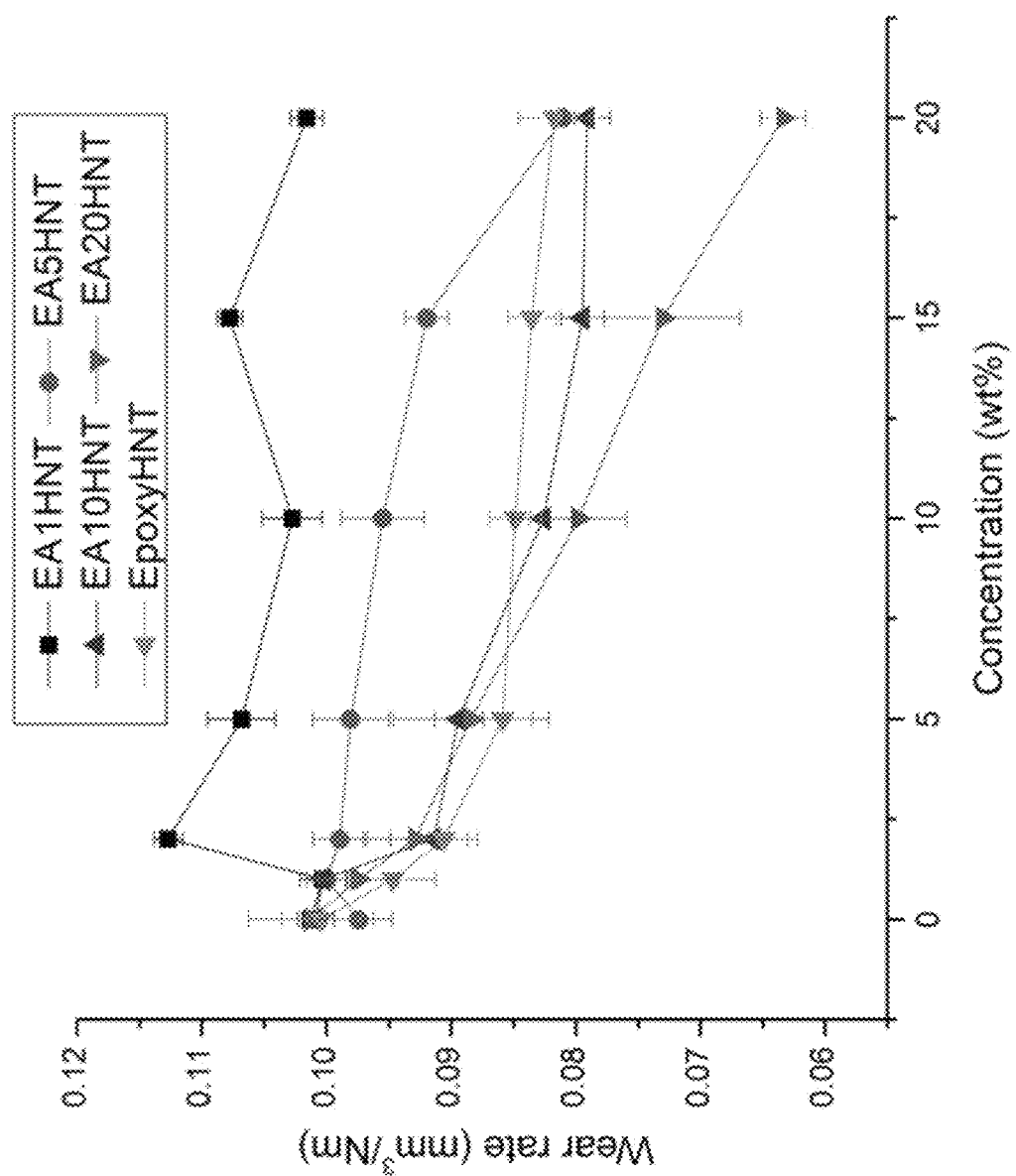
FIG. 18 shows the results of indentation scratch tests.
Figure 19:
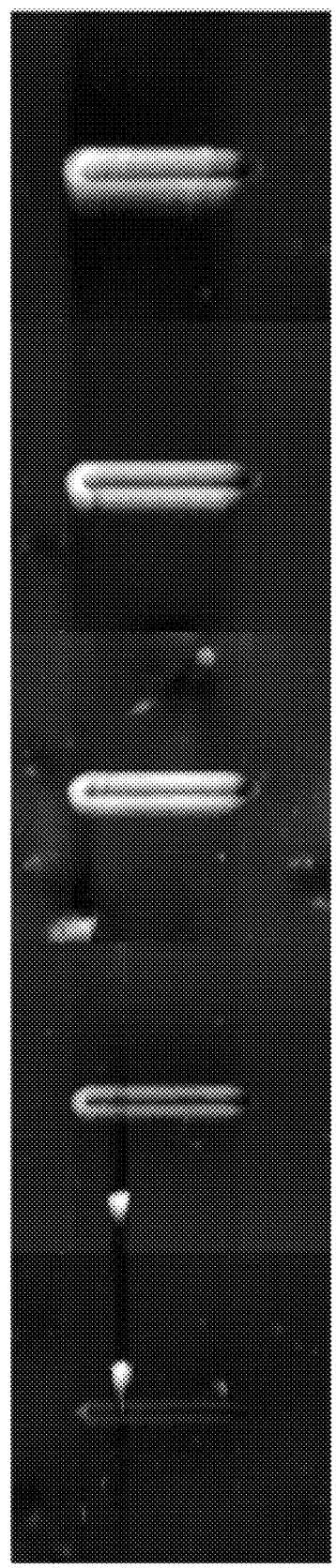
FIG. 19 shows in-situ imaging of scratches at various loadings of 100, 200, 300, 400 and 500 µN.

In summary, hollow tubular halloysite HNTs were used as reinforcement fillers in transparent epoxy composites. A spray coating process was used to control hydrodynamic flow to align the particles; at the same time the elevated levels of viscosity in HNTs suspensions preserved the HNT orientations upon impacting the substrate surface. SEM images showed an improvement of alignment with increasing viscosity. Indentation results showed a consistent increase in modulus and hardness values with higher HNT orientation except for those composites processed from acetone-free epoxy fluids. FIG. 18 shows with higher HNT alignment, composites showed more scratch resistance. FIG. 19 shows the in-situ imaging of scratches during scratching tests. The drop in mechanical properties in $E_1p_0A_0$ composites was attributed to the poor dispersion quality in the absence of acetone. In summary, this study has revealed favorable levels of anisotropic mechanical properties, mainly induced by particle orientation. The work provides a new perspective for optimal coating design as well as a favorable, scalable processing methodology.

EXAMPLES

Materials: Dragonite™ HNT clay was obtained from Applied Minerals (density 2.54±0.03 g·cm$^{-3}$, inner diameter 10-20 nm, outer diameter 30-60 nm, and aspect ratio between 20 and 200. BET pore volume 20%, surface area up to 100 m$^2$·g$^{-1}$, refractive index 1.534). Epoxy 142-112 (purchased from Epoxy Technology, Inc., density 1.18 g·cm$^{-3}$) and acetone (VWR, density 0.79 g·cm$^{-3}$) were used as obtained.

Processing: The thin-film coatings were fabricated using a spray coating method, shown in FIG. 2. The nozzle (manufactured by Paasche®) size is 1/50", distance between spray gun and substrate (usually a glass microscope slide) is 1", and compressed air pressure is 25 psi. The fluid phase of each formulation was made starting from 20 parts epoxy by weight and diluting with specific amount of acetone (i.e., epoxy: acetone weight ratios were 20:0, 20:1, 20:2, 20:4, and 20:20, and these corresponded to epoxy volume percentages of 100, 93, 87, 77 and 50 vol %). HNT was subsequently mixed with epoxy/acetone solutions. For each formulation, HNT concentrations with respect to epoxy in these various suspensions were 0, 1, 2, 5, 10, 15, 20 wt % (i.e., corresponding volume percentages of HNTs are approximately 0, 0.5, 1.0, 2.3, 4.8, 7.4, 10.2 vol % based on known densities of constituents).

The mixtures were magnetically stirred for 5 mins, mechanically mixed for 1 min, and sonicated for around 2 hours to eliminate bubbles. The prepared batch solutions were then spray coated onto glass slides, cured using a Dymax 5000-EC flood lamp (working distance 2-6"), with a total UV energy output of 225 mW/cm$^2$ at 1.0 inch in direct emission and wavelength mainly from 350 to 450 nm. The samples were abbreviated as $E_xA_yH_z$, with x as volume percentage of epoxy in the liquid phase of acetone and epoxy, x being 100, 93, 87, 77, 40 for the five solutions mentioned above, y is the acetone volume percentage, and z is HNT volume percentage in the final cured samples (i.e., 0, 0.5, 1.0, 2.3, 4.8, 7.4, 10.2 vol %), as shown in Table 2.

TABLE 2

Nomenclature of HNT composites

| Abbreviation | Example |
|---|---|
| $E_xA_yH_z$ | $E_{40}A_{60}H_{10}$ → volume percentage for epoxy and acetone is 40 vol % and 60 vol % in mixed epoxy/acetone spraying suspensions, and HNT concentration in finally cured dry composite is 1.0 vol % |

To study the HNT alignment effects on mechanical properties, composites with random in-plane HNT orientations were prepared using spin coating method. 1 ml mixed $E_{40}A_{60}H_z$ with z ranging from 0 to 10.2 vol % as mentioned were spin-coated onto glass slides at a rate of 5000 rpm, and cured in a similar fashion as the spray coating samples.

Indentation Tests:

Nanoindentation measurements were conducted using a TriboIndentator (Hysitron Inc.), equipped with a Berkovich diamond tip (semi conical tip with diameter of 1 µm). Indentation tests were operated in a displacement-control mode; the displacement excitation is applied to the sample according to a programmed loading function while the force response is continuously monitored with a resolution of 1 nN. The loading function in this work consisted of a 5s linear loading, a 5s unloading segments with a 10s force dwelling at the peak load to reduce the influence of creeping effects. See, Hu, H.; Onyebueke, L.; Abatan, A., Characterizing and modeling mechanical properties of nanocomposites-review and evaluation. *Journal of Minerals and Materials Characterization and Engineering* 2010, 9, 275-280, and Bhushan, B.; Li, X., Nanomechanical characterisation of solid surfaces and thin films. *International Materials Reviews* 2003, 48, 125-164, each of which is incorporated by reference in its entirety. The maximum displacement used was less than one tenth of the coating thickness (about 200 nm) to exclude the influence from the substrate. A total of 36 indents with lateral spacing of 2 µm were taken to obtain average reduced modulus and hardness values on both control and composite samples coated on glass slides.

Nanoindentation hardness is defined as the indentation load divided by the projected contact area of the indentation.

It is the mean pressure that a material will support under load. From the load-displacement curve, hardness can be obtained at the peak load ($P_{max}$) as, $H=P_{max}/A$, where A is the projected contact area. For an indenter with a known geometry such as the Berkovich tip used in this study, the projected contact area is a function of contact depth, which is measured by the nanoindenter in situ during indentation.

The elastic modulus was calculated using the Oliver-Pharr data analysis procedure[64] beginning by fitting the unloading curve to a power-law relation, $$E_r = \frac{\sqrt{\pi}}{2} \frac{S}{\sqrt{A_p}} \quad \text{(Equation 3)}$$

where S is the slope of the tangent to the loading curve at maximal load and $A_p$ is the contact area of the indenter. $E_r$ is related to the constituent properties by the instruments:

$$\frac{1}{E_r} = \frac{1-v^2}{E} + \frac{1-v_i^2}{E_i} \quad \text{(Equation 4)}$$

where E and v are the elastic modulus and Poisson's ratio for the sample, and $E_i$ and $v_i$ are the same quantities for the diamond indenter. For diamond, $E_i$=1141 GPa and $v_i$=0.07[62,63], and for epoxy used here, v=0.3.

Rheology:

The bulk rheological response of epoxy/acetone solutions was measured at 25° C. using a cone-and-plate (CP) geometry (2° cone, diameter 60 mm, and truncation 58 μm, part #513606905) on the AR-G2 rheometer (TAO manufactured rheometer). The steady shear viscosity of the solutions was measured at shear rates between 10 and 1000 *Differential Scanning calorimetry (DSC) and Thermo gravimetric Analyzer (TGA)*: DSC was performed using TA Instrument Q20 under $N_2$. The samples were first heated to 200° C. to remove the thermal history, cooled to 0° C. at 3° C./min and then heated from 0 to 250° C. at heating rate of 5° C./min. TGA was performed using TA Instrument TGA 2950 under $N_2$ from 30 to 900° C. at heating rate of 10° C./min.

Transmission Electron Microscopy (TEM) and Scanning Electron Microscopy (SEM):

TEM was used for the morphological investigation of the composites and the halloysite nanotubes using a JEOL 2010 Advanced High Performance TEM. In order to determine the structure of the halloysite nanotubes, the as-received powder of neat halloysite was suspended in ethanol, and a droplet of the suspension was deposited and dried on a carbon grid for TEM studies.

A field-emission high-resolution scanning electron microscope (Zeiss Supra 25, accelerating voltage 5 kV) was used to image the composite film structures. All samples were sputter coated with a thin (i.e., 10 nm) gold/palladium layer using a Gatan high-resolution ion beam coater. Samples were fractured in liquid nitrogen (around −200° C.) to expose the cross sectional structure of the thin film composite specimens.

Viscosity Measurements from Rheometer

Figure 11:
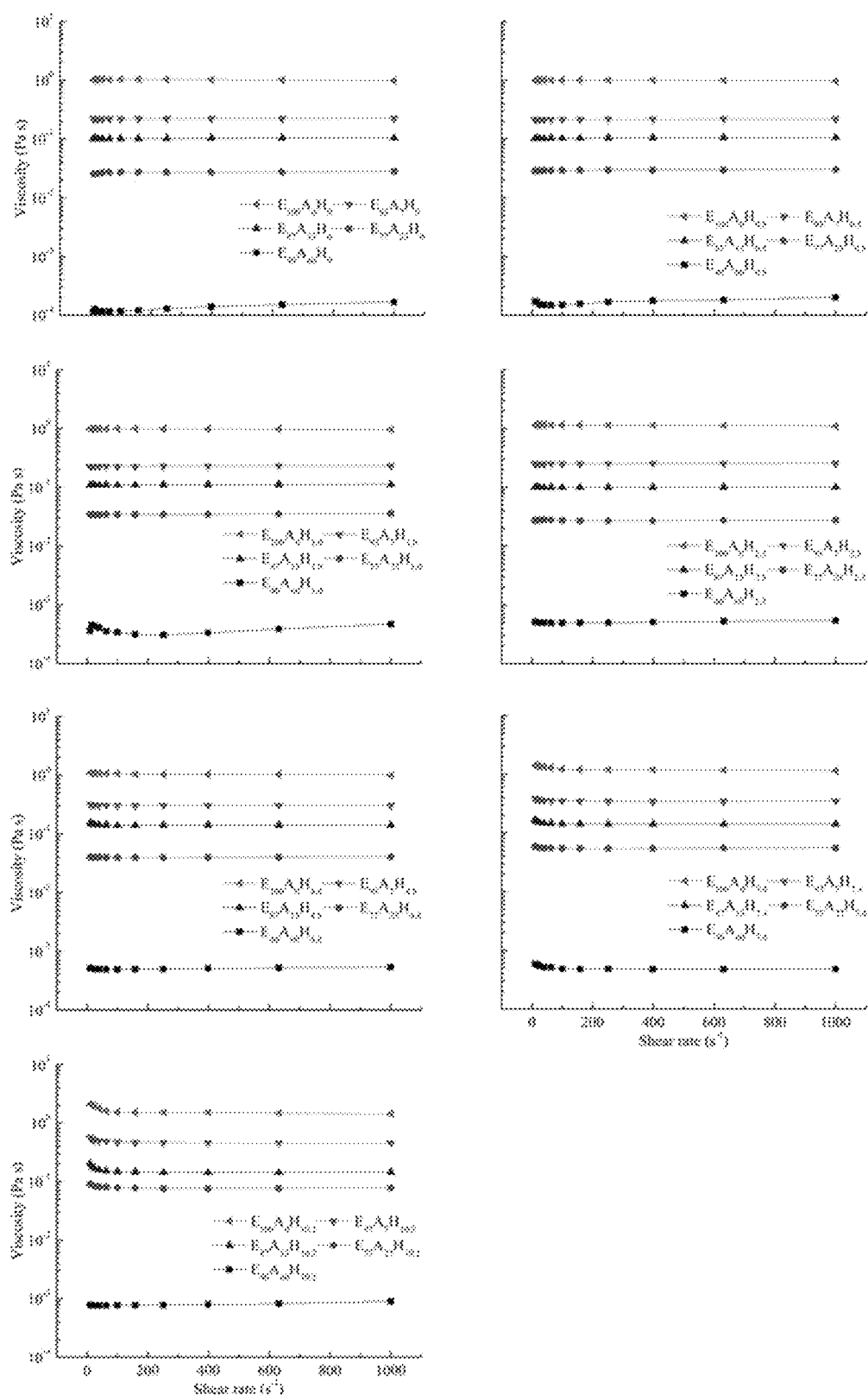
FIG. 11 shows viscosity vs. shear rate for HNT suspensions in $E_{40}A_{60}$, $E_{77}A_{23}$, $E_{87}A_{13}$, $E_{93}A_7$ and $E_{100}A_0$.

FIG. 11 shows an increasing viscosity trend with higher epoxy content. The concentration of HNTs in each figure remains constant. The particle concentration only slightly affects the viscosity compared to the significant change caused by the percentage of epoxy added. The shear rates in the rheometer measurements are from 10 to 1000 s$^{-1}$ and the temperature is set at 23° C.

Relaxation Time for Nanotubes in Fluids

Figure 12B:
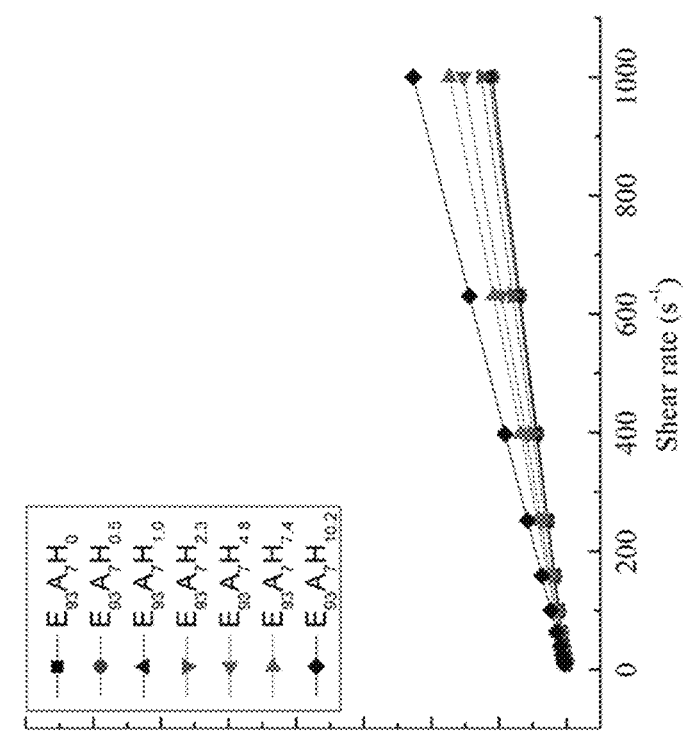
FIGS. 12A-12B shows shear stress as a function of shear rates for $E_{100}A_0$ (FIG. 12A) and $E_{93}A_7$ (FIG. 12B) based composites.
Figure 12A:
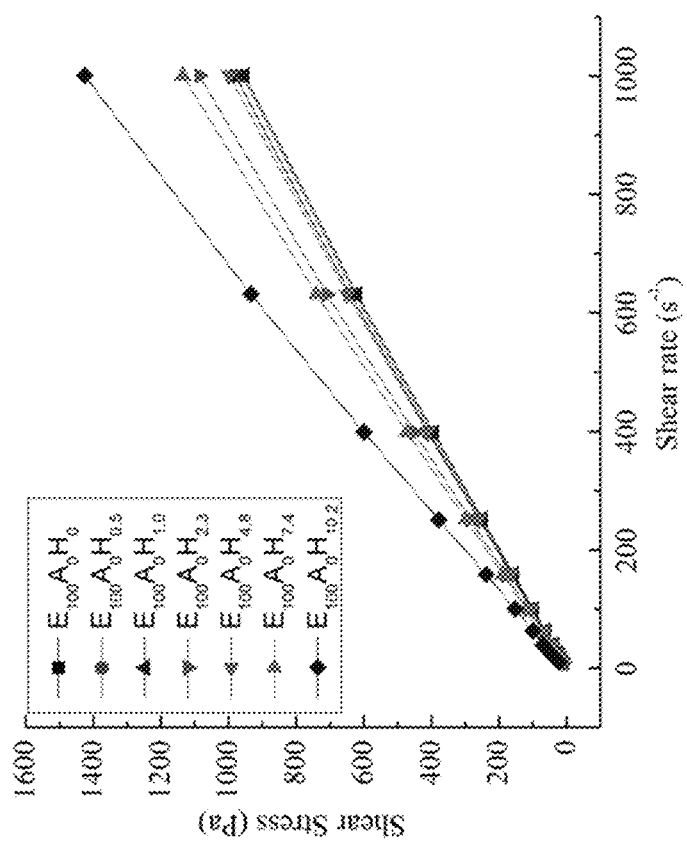

Shear-aligned halloysite nanotubes were sprayed on a glass slide. The alignment of nanotubes is constrained by the epoxy and given enough time the nanotubes would lose their alignment and reach a state of relaxation. The tilted angle and rate depend on particle features (i.e., length, density, shape), and liquid characteristics (i.e., viscosity, temperature, pressure)[1]. The fluid consisting of either pure epoxy or different epoxy/acetone mixtures all displayed Newtonian behavior, as shown in FIGS. 12A-12B. The orientation of the body would eventually be determined by inertia[1]. Bodies with force and front-end symmetry were torque free when settling in Stokes flow, so that the torques due to inertia were unopposed. This resulted in an eventual out-of-plane orientation for all particles[1]. See, Liu, Y. J.; Joseph, D. D., Sedimentation of particles in polymer solutions. *Journal of Fluid Mechanics* 1993, 255, 565-595, which is incorporated by reference in its entirety.

FIGS. 12A-12B shows linear trends between shear force and shear rate are observed, which exhibits the characteristic of Newtonian fluids. $E_{87}A_{13}$, $E_{77}A_{23}$ and $E_{40}A_{60}$ display the same Newtonian liquid behavior due to the increase in acetone concentration.

Figure 13:
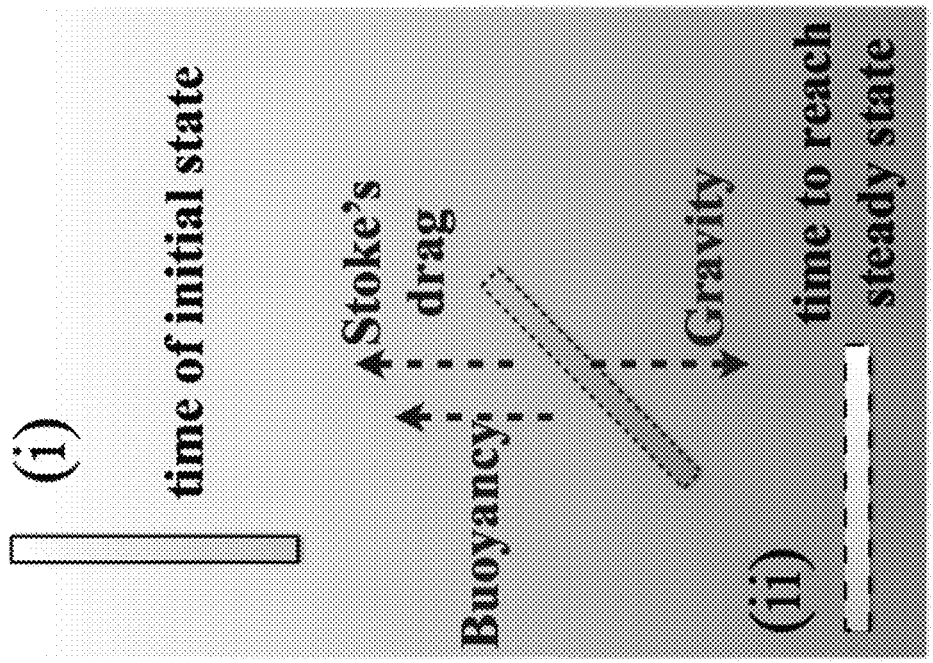
FIG. 13 shows schematic of the single halloysite nanotube states of (i) as-ejected into the coating surface, and (ii) reaching steady state, and micromechanics model.

FIG. 13 shows that relative flow motion past a falling particle in a fluid (i.e., a halloysite nanotube falling through the epoxy solution or melt) generates drag force, $F_d$, force due to gravity, $F_g$, as well as buoyancy, $F_b$.

The sedimentation of the tubes until reaching steady state is equivalent to the steady flow past a stationary long body of halloysite. To simplify the problem, the micromechanics analysis model for a single HNT particle (i.e., diameter of 40 nm and length of 2 μm) falling in a viscous fluid (i.e., viscosity taken from FIG. 4) was plotted in FIG. 13. The time for the tube to reach steady in-plane state was calculated based on this micromechanics model (FIG. 13).

According to Stoke's Law, the force of viscosity on a small particle moving through a viscous fluid is given by, $$F_d = 6\pi\mu R v \quad \text{(Equation S5)}$$

where $F_d$ is the friction force, known as Stoke's drag, acting on the interface between the fluid and particle. μ is the dynamic viscosity. See, Munson, B. R.; Young, D. F.; Okiishi, T. H., Fundamentals of fluid mechanics. New York 1990, 3, 4, which is incorporated by reference in its entirety. The liquid states studied here are all Newtonian fluids. Viscosity values were taken as a constant from experimental measurements. R is the quasi-radius of the object. v is the flow velocity relative to the object.

The single particle sedimentation procedure was analyzed by the equation of motion, $$\begin{aligned} F_{sedimentation} &= m\dot{v} \quad \text{(Equation S6)} \\ &= F_d - (F_g - F_b) \\ &= 6\pi\mu R v - (\rho_{particle} - \rho_{fluid}) \cdot g \cdot \frac{4}{3}\pi R^3 \end{aligned}$$

where $\rho_{particle}$ and $\rho_{fluid}$ are the density values of the particle and the fluid, respectively, and g is the gravitational acceleration.

Integrating both sides of Equation S2 gives, $$\int_{t_0}^{t_\infty} m\dot{v} dt = m(v_\infty - v_0) \quad \text{(Equation S7)}$$

$$= \int_{t_0}^{t_\infty} \left[ 6\pi\mu R v - (\rho_{particle} - \rho_{fluid}) \cdot g \cdot \frac{4}{3}\pi R^3 \right] dt$$

$$= \int_{t_0}^{t_\infty} [6\pi\mu R v] dt -$$

$$\int_{t_0}^{t_\infty} \left[ (\rho_{particle} - \rho_{fluid}) \cdot g \cdot \frac{4}{3}\pi R^3 \right] dt$$

To calculate the stability time, $t_\infty$, parameters of $v_0$ and $v_\infty$ are needed. The initial injection velocity, $v_0$, can be obtained, $$v_0 t_{spray} \pi r_{gun}^2 = r = V_{spray} \quad \text{(Equation S8)}$$

where $t_{spray}$ is the time consumed for spraying a specific fluidic volume $V_{spray}$, and $r_{gun}$ is radius of the spraying gun nozzle.

At the equilibrium state, the excess forces of gravity and buoyancy will balance the Stoke's drag force, $$F_d = F_g - F_b = (\rho_{particle} - \rho_{fluid}) g \frac{4}{3} \pi R^3 \quad \text{(Equation S9)}$$

The resulting equilibrium velocity, $v_\infty$, can be calculated via combining Equations S1 and S5, $$v = \frac{2}{9} \frac{(\rho_{particle} - \rho_{fluid})}{\mu} g R^2 \quad \text{(Equation S10)}$$

Taking all the equations above, the calculated particle settling time was plotted in FIG. 14.

Comparison with Prior Art

Figure 15:
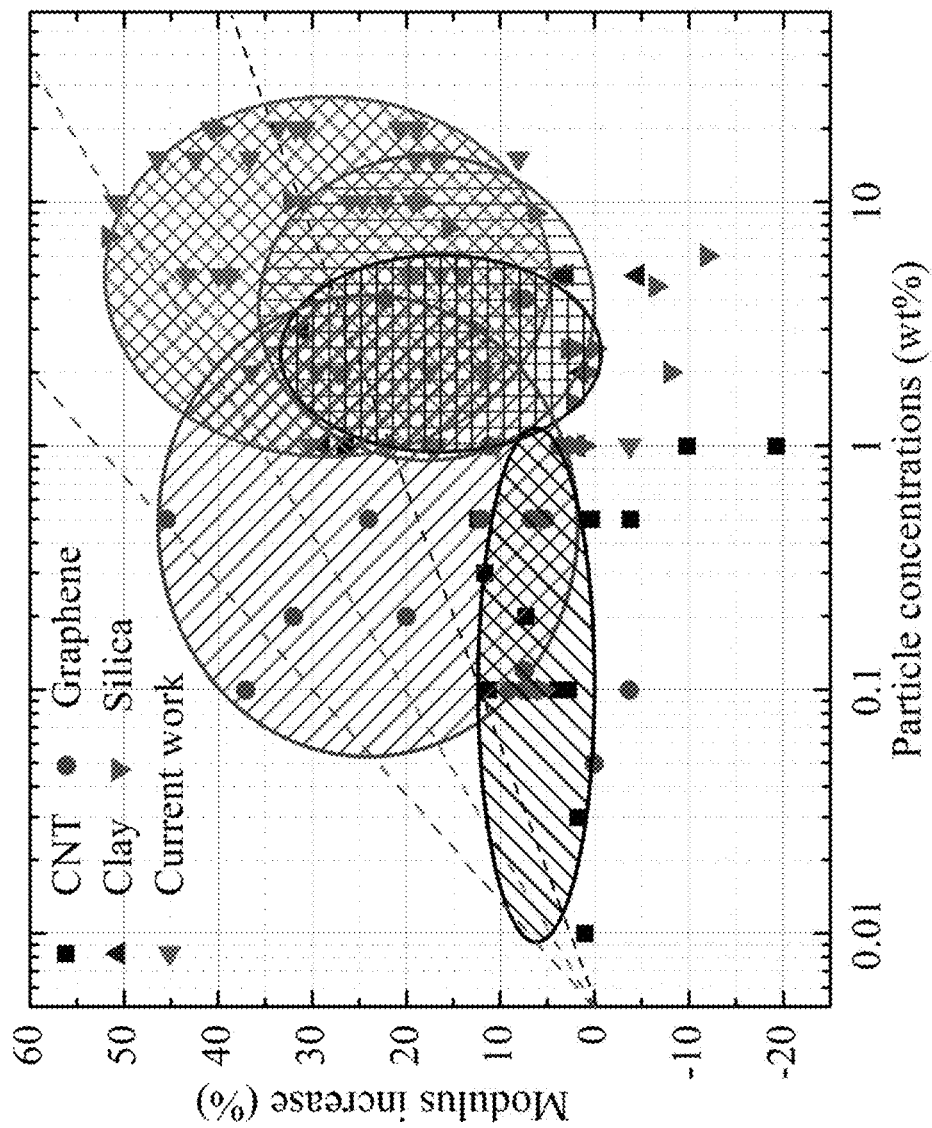
FIG. 15 shows Ashby Chart of modulus increase (i.e., %, $(E_{composite}-E_{epoxy})/E_{epoxy}$) of nanoparticles/epoxy composites vs. particle concentrations.

In FIG. 15, carbon nanotubes, graphene, montmorillonitrile clay, silica, and current work data has been plotted. For prior art data, see, Gojny, F. H.; Wichmann, M. H. G.; Fiedler, B.; Schulte, K., Influence of different carbon nanotubes on the mechanical properties of epoxy matrix composites—A comparative study. *Composites Science and Technology* 2005, 65, 2300-2313, Sun, L.; Warren, G. L.; O'Reilly, J. Y.; Everett, W. N.; Lee, S. M.; Davis, D.; Lagoudas, D.; Sue, H. J., Mechanical properties of surface-functionalized SWCNT/epoxy composites. *Carbon* 2008, 46, 320-328, Gojny, F.; Wichmann, M.; Kopke, U.; Fiedler, B.; Schulte, K., Carbon nanotube-reinforced epoxy-composites: enhanced stiffness and fracture toughness at low nanotube content. *Composites Science and Technology* 2004, 64, 2363-2371, Ayatollahi, M. R.; Shadlou, S.; Shokrieh, M. M., Fracture toughness of epoxy/multi-walled carbon nanotube nano-composites under bending and shear loading conditions. *Materials & Design* 2011, 32, 2115-2124, Ayatollahi, M. R.; Shadlou, S.; Shokrieh, M. M., Mixed mode brittle fracture in epoxy/multi-walled carbon nanotube nanocomposites. *Engineering Fracture Mechanics* 2011, 78, 2620-2632, Young, R. J.; Kinloch, I. A.; Gong, L.; Novoselov, K. S., The mechanics of graphene nanocomposites: A review. *Composites Science and Technology* 2012, 72, 1459-1476, Gkikas, G.; Barkoula, N. M.; Paipetis, A. S., Effect of dispersion conditions on the thermo-mechanical and toughness properties of multi walled carbon nanotubes-reinforced epoxy. *Composites Part B: Engineering* 2012, 43, 2697-2705, Tang, L.-c.; Zhang, H.; Han, J.-h.; Wu, X.-p.; Zhang, Z., Fracture mechanisms of epoxy filled with ozone functionalized multi-wall carbon nanotubes. *Composites Science and Technology* 2011, 72, 7-13, Karapappas, P.; Vavouliotis, A.; Tsotra, P.; Kostopoulos, V.; Palpetis, A., Enhanced fracture properties of carbon reinforced composites by the addition of multi-wall carbon nanotubes. *J. Compos Mater.* 2009, Hsieh, T. H.; Kinloch, A. J.; Taylor, A. C.; Kinloch, I. A., The effect of carbon nanotubes on the fracture toughness and fatigue performance of a thermosetting epoxy polymer. *Journal of Materials Science* 2011, 46, 7525-7535, Hsieh, T.; Kinloch, A.; Taylor, A.; Sprenger, S., The effect of silica nanoparticles and carbon nanotubes on the toughness of a thermosetting epoxy polymer. *J. Appl. Polym. Sci.* 2011, 119, 2135-2142, Liu, Y.; Wu, H.; Chen, G., Enhanced mechanical properties of nanocomposites at low graphene content based on in situ ball milling. *Polymer Composites* 2014, Tang, L.-C.; Wan, Y.-J.; Yan, D.; Pei, Y.-B.; Zhao, L.; Li, Y.-B.; Wu, L.-B.; Jiang, J.-X.; Lai, G.-Q., The effect of graphene dispersion on the mechanical properties of graphene/epoxy composites. *Carbon* 2013, 60, 16-27, Bortz, D. R.; Heras, E. G.; Martin-Gullon, I., Impressive Fatigue Life and Fracture Toughness Improvements in Graphene Oxide/Epoxy Composites. *Macromolecules* 2012, 45, 238-245, Zaman, I.; Phan, T. T.; Kuan, H.-C.; Meng, Q.; Bao La, L. T.; Luong, L.; Youssf, O.; Ma, J., Epoxy/graphene platelets nanocomposites with two levels of interface strength. *Polymer* 2011, 52, 1603-1611, Zaman, I.; Kuan, H. C.; Meng, Q.; Michelmore, A.; Kawashima, N.; Pitt, T.; Zhang, L.; Gouda, S.; Luong, L.; Ma, J., A facile approach to chemically modified graphene and its polymer nanocomposites. *Adv. Funct. Mater.* 2012, 22, 2735-2743, Chatterjee, S.; Wang, J. W.; Kuo, W. S.; Tai, N. H.; Salzmann, C.; Li, W. L.; Hollertz, R.; Niiesch, F. A.; Chu, B. T. T., Mechanical reinforcement and thermal conductivity in expanded graphene nanoplatelets reinforced epoxy composites. *Chemical Physics Letters* 2012, 531, 6-10, Jiang, T.; Kuila, T.; Kim, N. H.; Ku, B.-C.; Lee, J. H., Enhanced mechanical properties of silanized silica nanoparticle attached graphene oxide/epoxy composites. *Composites Science and Technology* 2013, 79, 115-125, Shokrieh, M. M.; Ghoreishi, S. M.; Esmkhani, M.; Zhao, Z., Effects of graphene nanoplatelets and graphene nanosheets on fracture toughness of epoxy nanocomposites. *Fatigue & Fracture of Engineering Materials & Structures* 2014, 37, 1116-1123, Li, Z.; Wang, R.; Young, R. J.; Deng, L.; Yang, F.; Hao, L.; Jiao, W.; Liu, W., Control of the functionality of graphene oxide for its application in epoxy nanocomposites. *Polymer* 2013, 54, 6437-6446, Chandrasekaran, S.; Sato, N.; Tolle, F.; Mülhaupt, R.; Fiedler, B.; Schulte, K., Fracture toughness and failure mechanism of graphene based epoxy composites. *Composites Science and Technology* 2014, 97, 90-99, Ahmadi-Moghadam, B.; Taheri, F., Fracture and toughening mechanisms of GNP-based nanocomposites in modes I and II fracture. *Engineering Fracture Mechanics* 2014, 131, 329-339, Galpaya, D.; Wang, M.; Liu, M.; Motta, N.; Waclawik, E.; Yan, C., Recent advances in fabrication and characterization of graphene-polymer nanocomposites. 2012, Qi, B.; Zhang, Q. X.; Bannister, M.; Mai, Y. W., Investigation of the mechanical properties of DGEBA-based epoxy resin with nanoclay additives. *Composite Structures* 2006, 75, 514-519, Wang, L.; Wang, K.; Chen, L.; Zhang, Y.; He, C., Preparation, morphology and thermal/mechanical properties of epoxy/nanoclay composite. *Composites Part A: Applied Science and Manufacturing* 2006, 37, 1890-1896, Wang, K.; Chen, L.; Wu, J.; Toh, M. L.; He, C.; Yee, A. F., Epoxy Nanocomposites with Highly Exfoliated Clay:

Mechanical Properties and Fracture Mechanisms. *Macromolecules* 2005, 38, 788-800, Zappalorto, M.; Salviato, M.; Quaresimin, M., Mixed mode (I+II) fracture toughness of polymer nanoclay nanocomposites. *Engineering Fracture Mechanics* 2013, 111, 50-64, Guevara-Morales, A.; Taylor, A. C., Mechanical and dielectric properties of epoxy-clay nanocomposites. *Journal of Materials Science* 2013, 49, 1574-1584, Tang, L.-C.; Zhang, H.; Sprenger, S.; Ye, L.; Zhang, Z., Fracture mechanisms of epoxy-based ternary composites filled with rigid-soft particles. *Composites Science and Technology* 2012, 72, 558-565, Liu, H.-Y.; Wang, G.-T.; Mai, Y.-W.; Zeng, Y., On fracture toughness of nano-particle modified epoxy. *Composites Part B: Engineering* 2011, 42, 2170-2175, Brunner, A. J.; Necola, A.; Rees, M.; Gasser, P.; Kornmann, X.; Thomann, R.; Barbezat, M., The influence of silicate-based nano-filler on the fracture toughness of epoxy resin. *Engineering Fracture Mechanics* 2006, 73, 2336-2345, Chen, L.; Chai, S.; Liu, K.; Ning, N.; Gao, J.; Liu, Q.; Chen, F.; Fu, Q., Enhanced epoxy/silica composites mechanical properties by introducing graphene oxide to the interface. *ACS Appl. Mater. Interfaces* 2012, 4, 4398-4404, Liang, Y. L.; Pearson, R. A., Toughening mechanisms in epoxy-silica nanocomposites (ESNs). *Polymer* 2009, 50, 4895-4905, Zhang, C.; Wang, J.; Du, Y.; Zhang, W., An investigation on the thermodynamic stability of V6Si5. *Journal of Materials Science* 2007, 42, 7046-7048, Kinloch, A. J.; Mohammed, R. D.; Taylor, A. C.; Eger, C.; Sprenger, S.; Egan, D., The effect of silica nano particles and rubber particles on the toughness of multiphase thermosetting epoxy polymers. *Journal of Materials Science* 40, 5083-5086, Zamanian, M.; Mortezaei, M.; Salehnia, B.; Jam, J. E., Fracture toughness of epoxy polymer modified with nanosilica particles: Particle size effect. *Engineering Fracture Mechanics* 2013, 97, 193-206, Dittanet, P.; Pearson, R. A., Effect of silica nanoparticle size on toughening mechanisms of filled epoxy. *Polymer* 2012, 53, 1890-1905, Johnsen, B. B.; Kinloch, A. J.; Mohammed, R. D.; Taylor, A. C.; Sprenger, S., Toughening mechanisms of nanoparticle-modified epoxy polymers. *Polymer* 2007, 48, 530-541, Bray, D. J.; Dittanet, P.; Guild, F. J.; Kinloch, A. J.; Masania, K.; Pearson, R. A.; Taylor, A. C., The modelling of the toughening of epoxy polymers via silica nanoparticles: The effects of volume fraction and particle size. *Polymer* 2013, 54, 7022-7032, and Ma, J.; Mo, M.-S.; Du, X.-S.; Rosso, P.; Friedrich, K.; Kuan, H.-C., Effect of inorganic nanoparticles on mechanical property, fracture toughness and toughening mechanism of two epoxy systems. Polymer 2008, 49, 3510-3523, each of which is incorporated by reference in its entirety.

Tilted lines stand for specific modulus increase in percentage, and the slopes indicate reinforcement in modulus per unit particle concentration. It can be seen that the current work showed intermediate reinforcement efficiency between graphene and carbon nanotubes; however, HNTs cost is $2/kg, while carbon nanotubes and graphene price range from $50/g to $500/g. The current work also achieves modulus increases beyond that from frequently used particles of montmorillonite and silica. The secret is in the particle alignment along loading direction.

Compared with CNT, graphene and clay particle, excellent dispersion quality allows for higher particle loadings and reinforcement (FIG. 15).

Composite Mechanics

Figure 6B:
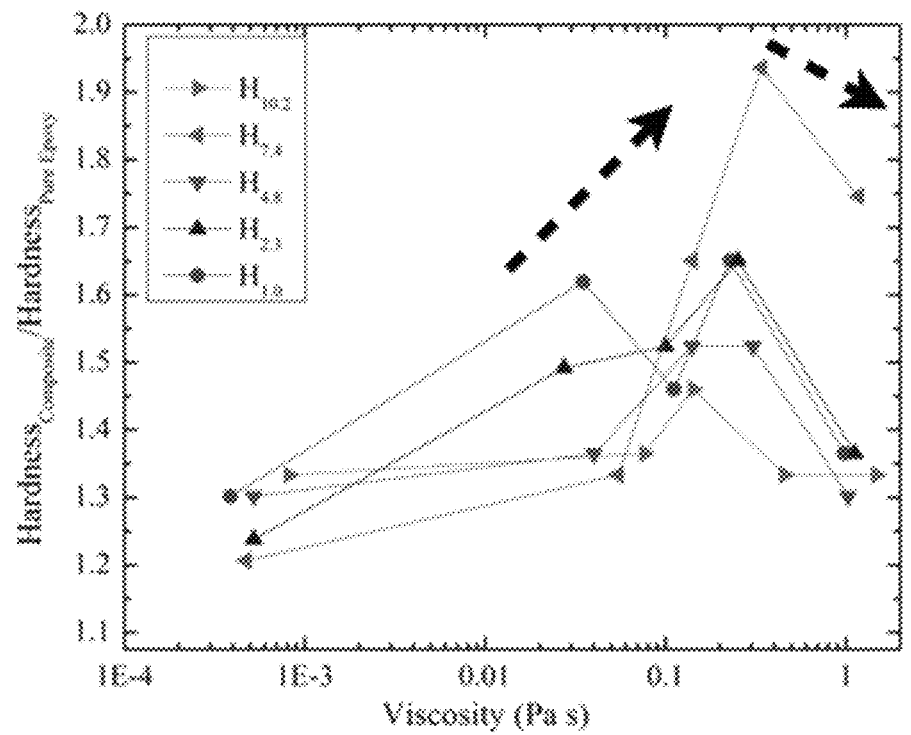
FIG. 6B shows hardness values.

TGA experiments were used to confirm the concentrations of HNT in the final processed composites. Data of this type is compared in FIG. 6A with the nominal HNT compositions, based on formulation compounding. It can be seen that the final composite concentrations are very consistent with the designed loadings (FIG. 6B). FIG. 6B shows the steady increase of mechanical properties with higher viscosity values in spray processing fluids. A drop at highest viscosity is attributed to the appearance of a significant number of aggregates in the samples. This also validates a stable distribution of HNTs in the various viscous spray-processing formulations, where epoxy/acetone ratios vary considerably. Macroscopic sedimentation was not observed even in 10.2 vol % HNT loadings.

In Cox-Krenchel model, length efficiency factor was defined, $$\eta_l = 1 - \left[\frac{\tanh(na)}{na}\right] \quad \text{(Equation S11)}$$

$$n = \sqrt{\left[\frac{2G_m}{E_f \ln(2R/d)}\right]} \quad \text{(Equation S12)}$$

$$a = \frac{l}{d} \quad \text{(Equation S13)}$$

where $G_m$ is the shear modulus of polymer matrix, 2R is the distance from the fiber to its nearest neighbor fiber, l and d mean the length and diameter of the particle.

At fixed fiber concentration below percolation (i.e., less than 1 vol % in the HNT nanocomposites) and under uniform dispersion, length efficiency is only dependent on aspect ratio and concentration as shown in Equations S7 to S9. FIG. 16C shows how the length efficiency factor changes with lumped parameter na, and the insert demonstrates how na changes with volume concentrations. Based on this curve from Equation S7, as well as the parameters including ① shear modulus of 1.7 GPa for epoxy as calculated from the experimentally determined Young's modulus (4.5 GPa), ② Poisson's ratio (0.3), ③ ensile modulus for HNTs of 300 GPa (see, Guimaraes, L.; Enyashin, A. N.; Seifert, G.; Duarte, H. A., Structural, electronic, and mechanical properties of single-walled halloysite nanotube models. *The Journal of Physical Chemistry C* 2010, 114, 11358-11363, and Lecouvet, B.; Horion, J.; D'Haese, C.; Bailly, C.; Nysten, B., Elastic modulus of halloysite nanotubes. *Nanotechnology* 2013, 24, 105704, each of which is incorporated by reference in its entirety), and ④ HNTs concentration of 0.5 vol % generate a value of 5 for na. This corresponds to a length efficiency of 81% in FIG. 16C. In this study, the HNT volume fractions, $V_f$, varied from ~0.5 vol % to ~10.2 vol %, indicating the matrix volume fractions, $V_m$, from ~99.5 vol % to ~89.8 vol %. This change in concentration, however, does not change the length efficiency factor significantly, with $\eta_l$ ranges from 81% to 86% (insert in FIG. 16C). Therefore, the analysis of orientation efficiency factor will reveal their main influencing effectiveness on mechanical properties as discussed in the manuscript.

Orientation of HNT Based on Composite Mechanics

The orientation factor can also be calculated based on composite mechanics. The spin-coating method produces a film with randomly orientated particles with an orientation factor $\eta_o$ of 0.2. See, Song, K.; Zhang, Y.; Meng, J.; Green, E. C.; Tajaddod, N.; Li, H.; Minus, M. L., Structural polymer-based carbon nanotube composite fibers: understanding the processing—structure—performance relationship. Materials 2013, 6, 2543-2577, which is incorporated by reference in its entirety. A linear fitting of the experimental modulus values between 0 and 1 vol % in spin-coated films gives effective modulus of HNT of ~312 GPa (i.e., moduli of 5.20, 5.74, and 5.81 GPa at HNT concentrations of 0, 0.5, and 1.0 vol %). At a rough estimation, $E_m$=4.5 GPa and $E_f$=312 GPa, the composite modulus relative to orientation factor (i.e., 0 to 1) and fiber volume fraction (i.e., 0 to 1 vol %) is plotted in FIG. 17. The spray-coated samples were shown as white symbols on the contour so that their orientation factors at specific volumes of 0.5 vol % and 1.0 vol % become straightforward. The orientation factors showed consistent increase with viscosity values. FIG. 17 shows that with a specific volume fraction, better consistency in particle orientation results in high modulus values. In spite of this relationship between orientation factor and modulus values, composite mechanics is not a straightforward method for particle orientation calculations. Therefore statistical quantifications of HNT orientations in these composites are important and have been given in the manuscript discussion sections.

TABLE 3

Orientation factors calculated from composite mechanics

| Samples | Orientation factors based on composite mechanics ||||| 
|---|---|---|---|---|---|
|  | $E_{40}A_{60}$ | $E_{77}A_{23}$ | $E_{87}A_{13}$ | $E_{93}A_7$ | $E_{100}A_0$ |
| 0.5 (vol %) | 0.38 | N/A | 0.46 | 0.97 | 0.69 |
| 1.0 (vol %) | 0.72 | 0.68 | 0.81 | 1.00 | 0.96 |

Analyses of HNTs Alignment Based on SEM Images

TABLE 4

Gaussian fitting of halloysite orientations in composite coatings

| Sample || Fitted Gaussian equation parameters ||
|---|---|---|---|
| Solution components | HNTs Concentration (vol %) | A | FWHM |
| $E_{77}A_{23}$ | 0.5 | 426.72 | 28.71 |
|  | 1.0 | 477.15 | 49.47 |
|  | 4.8 | 413.50 | 26.55 |
|  | 10.2 | 451.45 | 22.49 |
| $E_{93}A_7$ | 0.5 | 504.60 | 96.76 |
|  | 1.0 | 484.29 | 66.70 |
|  | 4.8 | 496.07 | 70.93 |
|  | 10.2 | 458.86 | 65.17 |
| $E_{100}A_0$ | 0.5 | 497.18 | 58.83 |
|  | 1.0 | 474.18 | 44.40 |
|  | 4.8 | 468.66 | 26.37 |
|  | 10.2 | 425.74 | 15.56 |

Note:

Gaussian fitting of $y = y_0 + \dfrac{Ae^{\frac{-4 \ln(2)(x-x_C)^2}{w^2}}}{w\sqrt{\dfrac{\pi}{4\ln(2)}}}$, where $y_c = y_0 + A/(FWHM*sqrt(\pi/4\ln2))$, FWHM is the full width at half maximum and A is the area integrated. $y_0$ is base, $x_c$ stands for the fitted peak center which is 0° for out-of-plane aligned particles and 90° for in-plane aligned particles. The script access of the function is nlf_Gaussian(x, y0, xc, A, w).

Intrinsic Modulus for Halloysite

TABLE 5

Mechanics of HNT from literature and current work

| Report | Test method | Parameters |
|---|---|---|
| 2005* | First principle study using molecular dynamics simulations | Kaolinite with halloysite composition shows Young's modulus of 170 GPa along tube direction |
| 2010* | Simulation using self-consistent charge density-functional based tight-binding (SCC-DFTB) method | Single-wall HNT posses moduli between 234 and 339 GPa with diameters ranging from 1.7 to 4.6 nm |
| 2011* | TEM observed cantilever beam bending tests | Bending moduli ranges from 60 to 156 GPa dependent on radius from 16 to 70 nm |
| 2013* | Three-point bending tests performed on individual nanotubes using an AFM tip | The calculated average elastic modulus ranges from average 10 to 600 GPa, with a diameter-normalized value of 140 GPa, measured for a set of tubes with outer diameters ranging between 50 and 160 nm. The highest value reaches around 600 GPa at diameters less than 50 nm. |
| Current work | Composite mechanics | Reinforcement modulus without considering misalignment effects reached as high as 182 GPa and HNT intrinsic modulus was predicted to be around 420 GPa |

*See, Guimaraes, L.; Enyashin, A. N.; Seifert, G.; Duarte, H. A., Structural, electronic, and mechanical properties of single-walled halloysite nanotube models. *The Journal of Physical Chemistry C* 2010, 114, 11358-11363, Lecouvet, B.; Horion, J.; D'Haese, C.; Bailly, C.; Nysten, B., Elastic modulus of halloysite nanotubes. *Nanotechnology* 2013, 24, 105704, Sato, H.; Ono, K.; Johnston, C. T.; Yamagishi, A., First-principles studies on the elastic constants of a 1:1 layered kaolinite mineral. *American Mineralogist* 2005, 90, 1824-1826, and Lu, D.; Chen, H.; Wu, J.; Chan, C. M., Direct measurements of the Young's modulus of a single halloysite nanotube using a transmission electron microscope with a bending stage. *Journal of nanoscience and nanotechnology* 2011, 11, 7789-7793, each of which is incorporated by reference in its entirety.

Percolation Threshold Analyses

HNT particles have been known for their high modulus, up to around 600 GPa at outer diameters of less than 50 nm. However, as tubes started aggregating, the accumulating defects and the lack of inter-tubular registry resulting from diameter differences and helicity variations will lead to decrease of effective modulus, especially shear modulus. For example, carbon nanotubes have been shown to have shear modulus of 6 GPa for 4.5 nm bundles, 2.3 GPa for 9 nm bundles and 0.7 GPa for 20 nm bundles. See, Salvetat, J.-P.; Briggs, G. A. D.; Bonard, J.-M.; Bacsa, R. R.; Kulik, A. J.; Stockli, T.; Burnham, N. A.; Forro, L., Elastic and shear moduli of single-walled carbon nanotube ropes. *Physical Review Letters* 1999, 82, 944, Satcurada, I.; Ito, T.; Nakamae, K., Elastic moduli of the crystal lattices of polymers. *Journal of Polymer Science Part C: Polymer Symposia* 1967, 15, 75-91, and Popov, V.; Van Doren, V.; Balkanski, M., Elastic properties of crystals of single-walled carbon nanotubes. *Solid State Communications* 2000, 114, 395-399, each of which is incorporated by reference in its entirety. Therefore a theoretical estimation of the average modulus dependent on bundle size will be necessary to understand the plateau region in FIGS. 9A-9D. The average effective modulus $\langle E_x \rangle$ has been calculated using continuum mechanics (Equation S10). See, Song, K.; Zhang, Y.; Meng, J.; Green, E. C.; Tajaddod, N.; Li, H.; Minus, M. L., Structural polymer-based carbon nanotube composite fibers: understanding the processing—structure—performance relationship. *Materials* 2013, 6, 2543-2577, which is incorporated by reference in its entirety. Modulus along longitudinal direction ($E_1$), transverse direction ($E_2$), and Poisson's ratio (v) were from Table 5 and also listed in FIG. 9D. Shear modulus ($G_{12}$) dependent on bundles size is not available experimentally; here in this research were taken as 2, 5, 10, and 20 GPa to show the average modulus change with bundle size. See, Liu, T.; Kumar, S., Effect of Orientation on the Modulus of SWNT Films and Fibers. *NANO LETT* 2003, 3, 647-650, which is incorporated by reference in its entirety. The existence of plateau region can be attributed to two aspects. (i) From FIG. 9D, it can be seen that with the bundle size increase, the decrease in effective average modulus can be one order of magnitude lower. In addition, for the same bundle size, the average modulus was also found to improve with higher alignment. This is also consistent with the phenomenon as indicated from the trend line in FIGS. 8A and 8B. (ii) The bundled structure not only influences the intrinsic particle modulus and hardness values but also affect the interaction between polymers and particles. Fully dispersed and exfoliated nanotubes will have more contact area than aggregates, and reinforcement efficiency has also been found to be linearly proportional to interfacial area[54]. This could be another reason for the formation of plateau.

$$\frac{1}{\langle E_x \rangle} = \frac{\langle \cos^4\theta \rangle}{E_1} + \frac{\langle \sin^4\theta \rangle}{E_2} + \left(\frac{1}{G_{12}} - \frac{2v_{12}}{E_1}\right)\langle \cos^2\theta \cos^2\theta \rangle = \frac{1}{E_2} + \left(\frac{1}{G_{12}} - \frac{2v_{12}}{E_1} - \frac{2}{E_2}\right)\langle \cos^2\theta \rangle + \left(\frac{1}{E_1} + \frac{1}{E_2} - \frac{1}{G_{12}} + \frac{2v_{12}}{E_1}\right)\langle \cos^4\theta \rangle$$ (Equation S14)

Other embodiments are within the scope of the following claims.

What is claimed is:

1. A method of making a coating comprising:
    preparing a surface;
    providing a polymer in a fluid phase;
    diluting the fluid phase with a solvent;
    adding a plurality of nanotubes to the mixture;
    spraying the mixture through a nozzle onto the surface to form a composite;
    upon exiting the nozzle, accelerating the nanotubes in a gas stream and aligning the nanotubes along a plane normal direction; and
    maintaining elevated levels of viscosity in the mixture to preserve the nanotube orientations upon impacting the surface.

2. The method of claim 1, wherein the nanotubes include halloysite nanotubes.

3. The method of claim 1, wherein the nanotubes include silica.

4. The method of claim 1, wherein the polymer includes epoxy.

5. The method of claim 1, wherein the polymer is starch, chitosan, gelatin, cellulose, pectin, or polyvinyl alcohol.

6. The method of claim 1, wherein the plurality of nanotubes are aligned unidirectionally.

7. The method of claim 1, wherein the plurality of nanotubes are aligned vertically to the surface.

8. The method of claim 1, further comprising flowing a compressed air to facilitate spraying the mixture.

9. The method of claim 1, wherein the mixture further includes a solvent.

10. The method of claim 9, wherein the solvent is acetone.

11. The method of claim 1, further comprising curing the coating with UV.

12. The method of claim 1, wherein the nanotubes include graphene.

13. The method of claim 1, wherein the nanotubes include nanoclay.

* * * * *